United States Patent
Naito et al.

(10) Patent No.: US 11,656,530 B2
(45) Date of Patent: May 23, 2023

(54) IMAGE BLUR CORRECTION DEVICE HAVING IMAGE BLUR-CORRECTING FUNCTION

(71) Applicant: CANON KABUSHIKI KAISHA, Tokyo (JP)

(72) Inventors: Go Naito, Kawasaki (JP); Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 670 days.

(21) Appl. No.: 16/710,433

(22) Filed: Dec. 11, 2019

(65) Prior Publication Data
US 2020/0201139 A1    Jun. 25, 2020

(30) Foreign Application Priority Data

| Dec. 19, 2018 | (JP) | JP2018-237496 |
| Jun. 24, 2019 | (JP) | JP2019-116536 |
| Jun. 24, 2019 | (JP) | JP2019-116537 |

(51) Int. Cl.
*G03B 5/00* (2021.01)
*G02B 27/64* (2006.01)
*H04N 23/68* (2023.01)

(52) U.S. Cl.
CPC ............. *G03B 5/00* (2013.01); *G02B 27/646* (2013.01); *H04N 23/687* (2023.01);
(Continued)

(58) Field of Classification Search
CPC .......... G02B 27/646; G03B 2205/0015; G03B 2205/0038; G03B 2205/0069;
(Continued)

(56) References Cited

U.S. PATENT DOCUMENTS 7,961,220 B2    6/2011   Orihashi
2011/0298970 A1*  12/2011  Shinohara .............. G03B 13/02
                                                        348/373

(Continued)

FOREIGN PATENT DOCUMENTS

| JP | 2008064863 A | 3/2008 |
| JP | 2013190653 A | 9/2013 |

(Continued)

*Primary Examiner* — Antoinette T Spinks
(74) *Attorney, Agent, or Firm* — Rossi, Kimms & McDowell LLP

(57) ABSTRACT

An image blur correction device that forms a strong rolling surface on a movable member having a resin part and is improved in strength of the movable member. The image blur correction device includes a fixed member, rolling balls, and the movable member that includes a sheet metal member and the resin part molded integrally with the sheet metal member, holds an image capture device, and is movable in a direction orthogonal to an optical axis of the image capture device, relative to the fixed member. Part of the movable member, where the sheet metal member is exposed from the resin part, forms the rolling surfaces on which the rolling members roll, and the sheet metal member is formed into a shape surrounding the image capture device, as viewed from the optical axis direction.

14 Claims, 13 Drawing Sheets

(52) U.S. Cl.
CPC ............... *G03B 2205/0015* (2013.01); *G03B 2205/0069* (2013.01); *G03B 2205/0084* (2013.01)

(58) Field of Classification Search
CPC .. G03B 2205/0084; G03B 5/00; H04N 23/54; H04N 23/55; H04N 23/6812; H04N 23/687
See application file for complete search history.

(56) References Cited

U.S. PATENT DOCUMENTS

| | | | | |
|---|---|---|---|---|
| 2016/0033786 | A1* | 2/2016 | Kim | H04M 1/0264 359/557 |
| 2017/0139225 | A1* | 5/2017 | Lim | G02B 27/646 |
| 2017/0139227 | A1* | 5/2017 | Kim | G03B 5/02 |
| 2020/0225506 | A1* | 7/2020 | Awazu | G03B 5/06 |

FOREIGN PATENT DOCUMENTS

| | | | |
|---|---|---|---|
| JP | 2013231923 A | | 11/2013 |
| KR | 20200133703 A | * | 11/2020 |
| KR | 20220042894 A | * | 4/2022 |

\* cited by examiner

IMAGE BLUR CORRECTION DEVICE HAVING IMAGE BLUR-CORRECTING FUNCTION

BACKGROUND OF THE INVENTION

Field of the Invention

The present invention relates to an image blur correction device having an image blur-correcting function.

Description of the Related Art

In recent years, there have been proposed some types of a system of an image blur correction mechanism equipped in an image capture apparatus or a lens barrel. For example, there are known a system of driving some of lenses of a photographing optical system for image blur correction and a system of driving an image capture device included in a camera body for image blur correction. Further, there is known a system in which the above-mentioned systems are combined for image blur correction, so as to drive both of the some of lenses of the photographing optical system and the image capture device.

The above-mentioned image blur correction mechanism that drives the lens and/or the image capture device (hereinafter generically referred to as the optical element) generally employs a system for moving the optical element in a direction orthogonal to a photographing optical axis. As a system for driving the optical element, there is known one referred to as the voice coil motor (VCM) system. The VCM system has a configuration in which magnets are provided in one of a fixed member and a movable member, a coil is provided in the other, and the coil is energized in a magnetic circuit formed by the magnets to thereby generate a driving force derived from the Lorentz force. In the VCM system, a predetermined space is formed between the magnets and the coil, and rolling members, such as balls, are provided in this space, whereby it is possible to smoothly drive the optical element with less loss caused by friction. Surfaces on which the rolling members rolls during driving is referred to as the rolling surfaces. The rolling surfaces are generally formed by a method of affixing a roll reception member having a hard surface to the movable member and the fixed member.

In combination, to prevent the rolling members from falling off, a mechanism is generally integrated which generates an urging force for urging both of the fixed member and the movable member toward the rolling members. As the urging method, there are known a method of urging the fixed member and the movable member using a spring such that the rolling members are sandwiched between the movable member and the fixed member, and a method of arranging magnets and a magnetic component (object to be attracted) in one and the other of the movable member and the fixed member, respectively, thereby causing the movable member and the fixed member to magnetically attract each other.

Further, for an image capture apparatus equipped with an image blur correction mechanism (image plane anti-vibration mechanism) that translationally moves an image capture device package holding an image capture device, there has been proposed a technique focusing on a problem caused in a case where part for holding the image capture device package is formed of resin. Japanese Laid-Open Patent Publication (Kokai) No. 2008-64863 discloses a technique focusing on heat dissipation of the image capture device package, and using, in a case where a movable frame for holding the image capture device package is formed of resin, resin having a high thermal conductivity. According to the technique disclosed in Japanese Laid-Open Patent Publication (Kokai) No. 2008-64863, it is possible to prevent excessive temperature rise of the image capture device package and an image sensor, whereby it is possible to provide a proper image with suppressed thermal noise.

Incidentally, in Japanese Laid-Open Patent Publication (Kokai) No. 2013-231923, when the movable member is molded of resin, the rolling surfaces described above are formed by molding the movable member integrally with a ball receiving sheet metal. With this, a step for mounting a member forming the rolling surfaces is eliminated. However, since the movable member is mainly formed of resin, in a case where the optical element held by the movable member is relatively large or heavy, it is important to ensure the strength of the movable member for driving the movable member such that the function of the optical element is properly maintained. Particularly, in a case where the method of forming the rolling surfaces as disclosed in Japanese Laid-Open Patent Publication (Kokai) No. 2013-231923 is employed, the strength of the movable member is not considered, which may cause insufficiency of the strength.

Further, the technique disclosed in Japanese Laid-Open Patent Publication (Kokai) No. 2008-64863 focuses on the temperature of the sensor, but does not consider deformation of a component, caused due to temperature change. For example, there is a fear that there may arise such a problem that the image plane is bent due to temperature change, making it is impossible to adjust the focus on the whole screen. Particularly, in a case where the components are fixed with an adhesive, there is a fear that it is impossible to maintain the performances of the components due to thermal stress occurring on adhesion interface. Therefore, there is room for improvement in suppressing lowering of the reliability, which can be caused due to thermal stress occurring on the adhesion interface.

SUMMARY OF THE INVENTION

The present invention provides an image blur correction device that forms a strong rolling surface on a movable member having a resin part and is improved in strength of the movable member.

Further, the present invention provides an image blur correction device that suppresses occurrence of thermal stress on an adhesion interface and is thereby improved in reliability.

In a first aspect of the present invention, there is provided an image blur correction device comprising a fixed member, a rolling member, and a movable member that includes a sheet metal member and a resin part molded integrally with the sheet metal member, holds an optical element, and is movable via the rolling member relative to the fixed member in a direction orthogonal to an optical axis of the optical element, wherein part of the movable member, where the sheet metal member is exposed from the resin part, forms a rolling surface on which the rolling member rolls, and wherein the sheet metal member is formed into a shape surrounding the optical element, as viewed from an optical axis direction.

In a second aspect of the present invention, there is provided an image blur correction device comprising an image capture device package including an image capture device, a holding member that holds the image capture device package, a fixed part that holds the holding member such that the holding member is relatively displaceable, and an adhesive for fixing a first adhesion interface on the image capture device package and a second adhesion interface on the holding member, wherein a linear expansion coefficient of part forming the first adhesion interface is larger than a linear expansion coefficient of the image capture device, wherein part forming the second adhesion interface is formed of resin, and a linear expansion coefficient of the part forming the second adhesion interface is larger than the linear expansion coefficient of the part forming the first adhesion interface, and wherein the linear expansion coefficient of the part forming the second adhesion interface is smaller than a linear expansion coefficient of any of an aluminum alloy and a magnesium alloy.

In a third aspect of the present invention, there is provided an image blur correction device comprising an image capture device package including an image capture device, a holding member that includes a sheet metal member and a resin part molded integrally with the sheet metal member, and holds the image capture device package, a fixed part that holds the holding member such that the holding member is relatively displaceable, and an adhesive for fixing a first adhesion interface on the image capture device package and a second adhesion interface on the holding member, wherein a linear expansion coefficient of part forming the first adhesion interface is larger than a linear expansion coefficient of the image capture device, wherein the second adhesion interface is formed by the resin part, and a linear expansion coefficient of part forming the second adhesion interface is larger than the linear expansion coefficient of the part forming the first adhesion interface, and wherein the linear expansion coefficient of the part forming the second adhesion interface is smaller than a linear expansion coefficient of the sheet metal member.

According to the first aspect of the present invention, it is possible to form the strong rolling surface on the movable member having the resin part and improve the strength of the movable member.

Further, according to the second and third aspects of the present invention, it is possible to suppress occurrence of thermal stress on the adhesion interface, and thereby improve the reliability.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
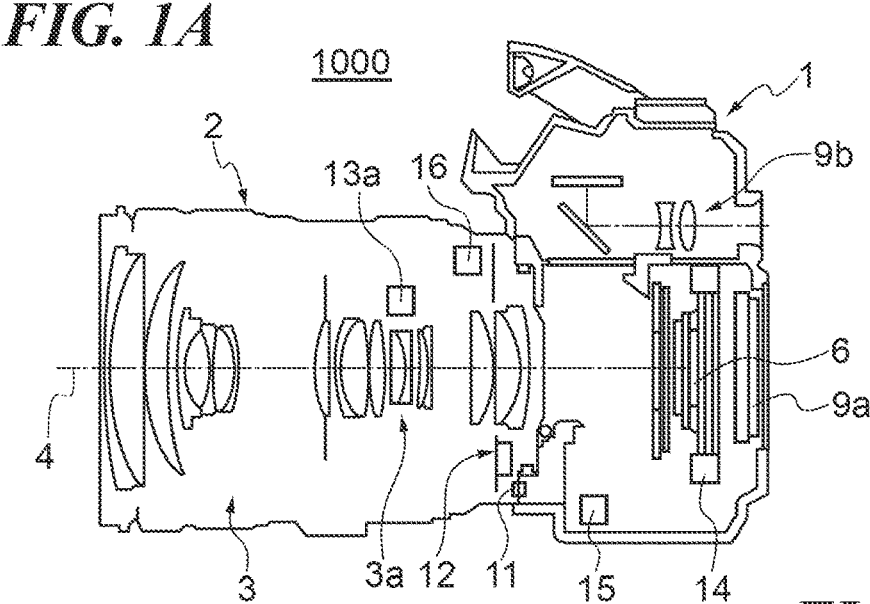
FIG. 1A is a cross-sectional view of an image capture apparatus to which an image blur correction device is applied.
Figure 1B:
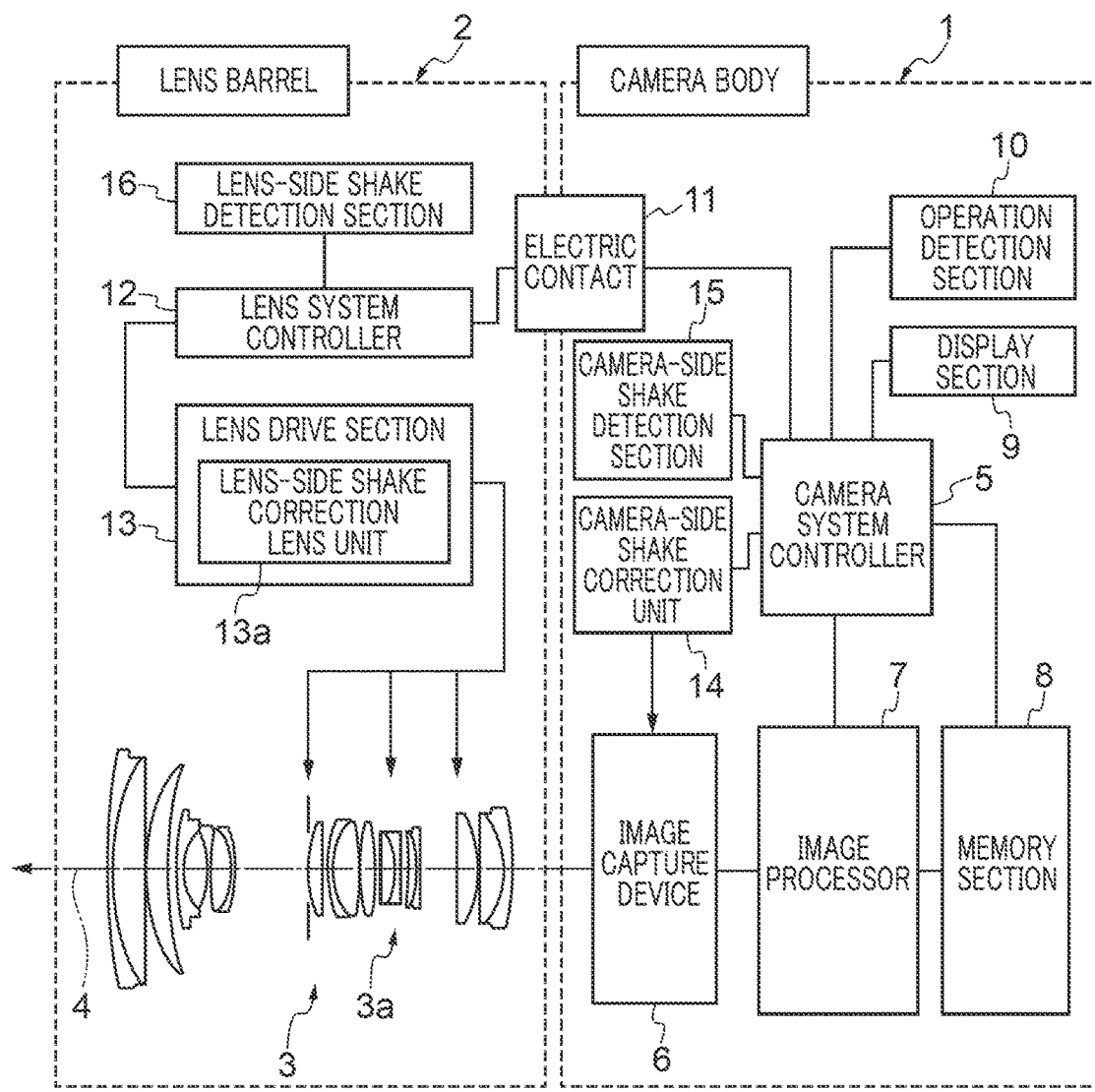
FIG. 1B is a block diagram showing an electrical configuration of the image capture apparatus to which the image blur correction device is applied.

FIG. 1A is a cross-sectional view of an image capture apparatus to which an image blur correction device according to a first embodiment of the present invention is applied. FIG. 1B is a block diagram showing an electrical configuration of the image capture apparatus, denoted by reference numeral 1000. This image capture apparatus 1000 is formed by a camera body 1 and a lens barrel 2. The lens barrel 2 is removable from the camera body 1 and the image capture apparatus 1000 is a so-called lens interchangeable camera. Note that the present invention can be applied even to an image capture apparatus including the lens barrel 2 which is fixed to the camera body 1 and cannot be removed therefrom.

The lens barrel 2 includes a photographing optical system 3, a lens system controller 12, a lens drive section 13, and a lens-side shake detection section 16. The photographing optical system 3 is formed by a plurality of lenses. The lens drive section 13 drives a focus lens for adjusting focus and a shake correction lens 3a for performing shake correction. The lens drive section 13 has a lens-side shake correction unit 13a. The lens-side shake correction unit 13a drives the shake correction lens 3a in a direction orthogonal to an optical axis 4 (photographing optical axis) of the photographing optical system 3. The lens-side shake detection section 16 detects a shake amount of the image capture apparatus 1000.

The camera body 1 includes a camera system controller 5, an image capture device 6, an image processor 7, a memory section 8, a display section 9, an operation detection section 10, a camera-side shake correction unit 14, a camera-side shake detection section 15, and an electric contact 11. The image capture device 6 is an optical element that photoelectrically converts an optical image formed through the lens barrel 2. The display section 9 includes a rear-side display device 9a provided on a rear side of the camera body 1 and an EVF (electronic viewfinder) 9b provided within a finder of the camera body 1. The operation detection section 10 detects a signal output from an operation section including a shutter release button, not shown, and so forth. The electric contact 11 is for communication between the camera body 1 and the lens barrel 2. The camera-side shake correction unit 14 drives the image capture device 6 in a direction orthogonal to the optical axis 4. The camera-side shake detection section 15 detects a shake amount of the image capture apparatus 1000.

The image capture apparatus 1000 formed by the camera body 1 and the lens barrel 2 has an image capture unit, an image processing unit, a recording/reproduction unit, and a control unit. The image capture unit mentioned here includes the photographing optical system 3 and the image capture device 6, and the image processing unit includes the image processor 7. Further, the recording/reproduction unit includes the memory section 8 and the display section 9. The control unit includes the camera system controller 5, the operation detection section 10, the camera-side shake detection section 15, the camera-side shake correction unit 14, the lens system controller 12, and the lens-side shake detection section 16, and further includes the lens drive section 13 including the lens-side shake correction unit 13a. Note that the lens system controller 12 and the lens drive section 13 can drive not only the shake correction lens 3a, but also the focus lens, a diaphragm, and so forth, none of which are shown.

The camera-side shake detection section 15 and the lens-side shake detection section 16 are capable of detecting rotation of the image capture apparatus 1000 about the optical axis 4, and the detection of rotation is realized by using e.g. a vibrating gyroscope. The camera-side shake correction unit 14 is a mechanism that drives the image capture device 6 on a plane orthogonal to the optical axis 4.

The lens-side shake correction unit 13a is a mechanism that drives the shake correction lens 3a in a direction orthogonal to the optical axis 4.

The above-described image capture unit is an optical processing system configured to form through the photographing optical system 3 an image of light from an object on an image plane of the image capture device 6. A focus evaluation amount and a proper exposure amount can be obtained from the image capture device 6 and the photographing optical system 3 is properly adjusted based on signals thereof, whereby the image capture device is exposed to an object light with a proper light amount to form an object image at or in the vicinity of the image capture device 6.

The image processor 7 has an analog-to-digital converter, a white balance adjustment circuit, a gamma correction circuit, an interpolation calculation circuit, etc., therein, and is capable of generating an image for recording. A color interpolation processor is included in this image processor 7 and generates a color image by performing color interpolation (demosaicing) on Bayer signals. Further, the image processor 7 compresses a still image, a moving image, sound, and so forth, using a predetermined method. Note that the image processor 7 can also generate a shake detection signal based on comparison between a plurality of images obtained from the image capture device 6, and hence the camera-side shake detection section 15 may be formed by the image capture device 6 and the image processor 7.

The memory section 8 includes a storage medium. The camera system controller 5 outputs an image to the memory section 8 and displays an image to be presented to a user on the display section 9. The camera system controller 5 generates and outputs a timing signal, and so forth, for use in image capture. The camera system controller 5 controls the image capture system, the image processing system, and the recording and reproduction system, in response to an external operation. For example, when it is detected by the operation detection section 10 that the shutter release button, not shown, has been pressed, the camera system controller 5 controls driving of the image capture device 6, the operations of the image processor 7, including compression processing, and so forth. Further, the camera system controller 5 controls the state of each segment on the display section 9. Note that the rear-side display device 9a is implemented by a touch panel and hence the rear-side display device 9a may serve as both the display section 9 and the operation section.

The operation for adjusting the optical system will be described. The image processor 7 is connected to the camera system controller 5, and the camera system controller 5 determines an appropriate focus position and diaphragm position based on signals output from the image capture device 6. The camera system controller 5 sends commands to the lens system controller 12 via the electric contact 11, and the lens system controller 12 properly controls a focus lens drive section and a diaphragm drive section, neither of which is shown. Further, in a mode for performing shake correction, the camera system controller 5 properly controls the camera-side shake correction unit 14 based on signals obtained from the camera-side shake detection section 15. Similarly, the lens system controller 12 properly controls the lens-side shake correction unit 13a based on signals obtained from the lens-side shake detection section 16.

More specifically, first, the camera system controller 5 and the lens system controller 12 acquire camera shake signals detected by the camera-side shake detection section 15 and the lens-side shake detection section 16, respectively.

Then, the camera system controller 5 and the lens system controller 12 calculate a driving amount of the image capture device 6 and a driving amount of the shake correction lens 3a for correcting image blur, based on the acquired shake signals, respectively. After that, the camera system controller 5 and the lens system controller 12 send the calculated driving amounts to the camera-side shake correction unit 14 and the lens-side shake correction unit 13a as the command values to drive the image capture device 6 and the shake correction lens 3a, respectively.

Further, as described above, the camera system controller 5 and the lens system controller 12 control the operations of the components of the camera body 1 and the lens barrel 2 in response to user operations performed on respective operation sections provided on the camera 1 and the lens barrel 2. This makes it possible to photograph a still image and a moving image.

Figure 2A:
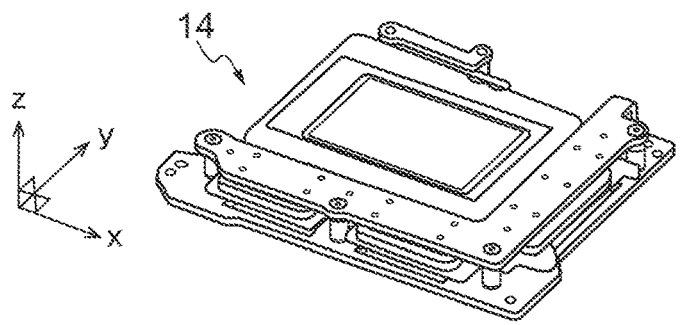
FIG. 2A is a perspective view of a camera-side shake correction unit.
Figure 2B:
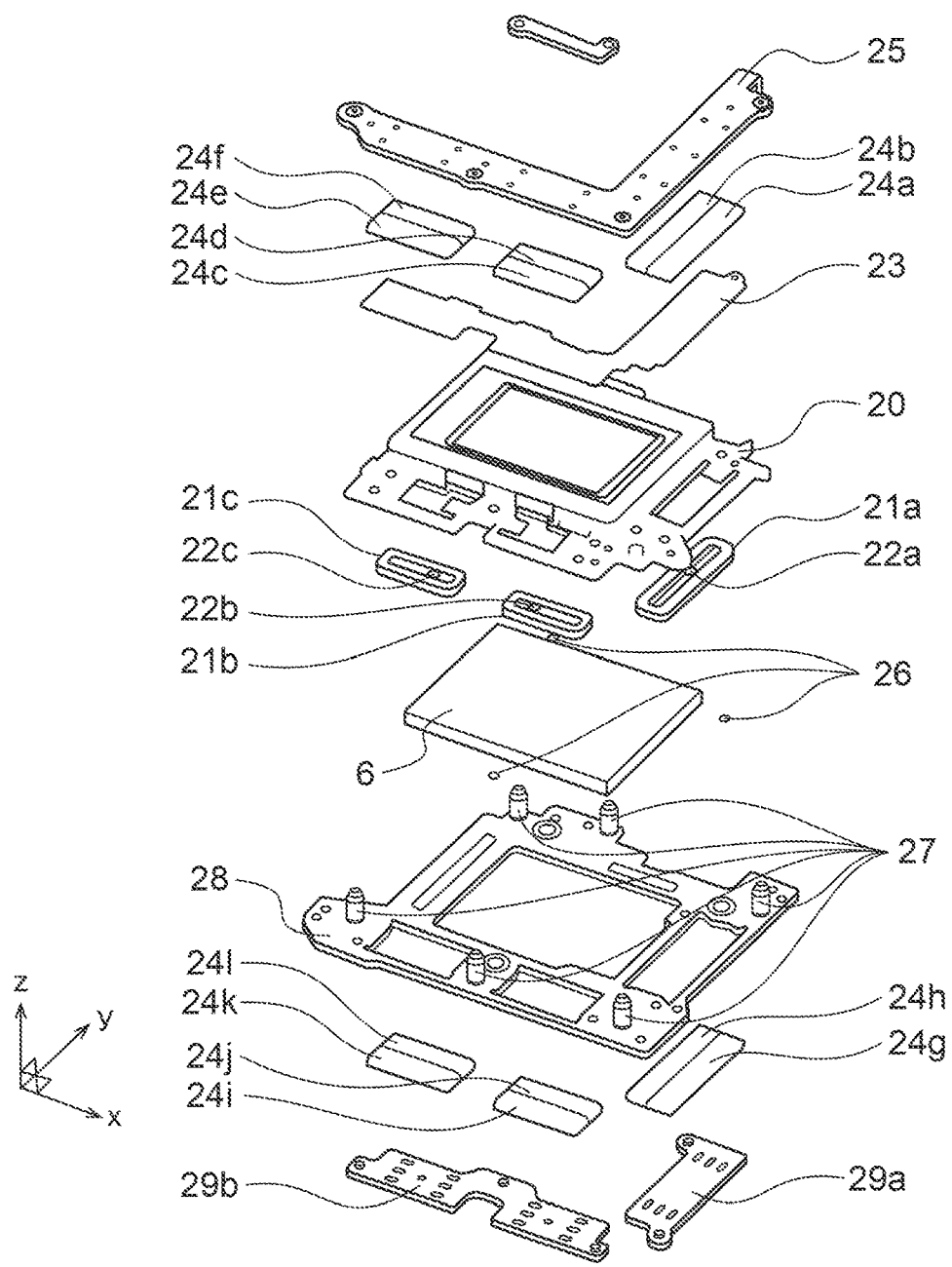
FIG. 2B is an exploded perspective view of the camera-side shake correction unit.

FIGS. 2A and 2B are a perspective view and an exploded perspective view of the camera-side shake correction unit 14, respectively. The camera-side shake correction unit 14 that displaces the image capture device 6 in the direction orthogonal to the optical axis 4 will be described with reference to FIGS. 2A and 2B. The directions of the camera-side shake correction unit 14 will be described using coordinate axes indicated in FIG. 2A. More specifically, a longitudinal direction of the image capture device 6 is defined as an x-axis, a shorter direction of the image capture device 6 is defined as a y-axis, and a direction of the optical axis 4 (photographing optical axis direction) is defined as a z-axis. A + (positive) side in the z-axis direction is an object side. A + (positive) side in the y-axis direction is the upper side of the image capture apparatus 1000 in a normal use state.

The camera-side shake correction unit 14 includes a movable unit and a fixed member 28 as the main components. This movable unit includes a movable member 20, coils 21, position detection sections 22, a flexible circuit board 23, and the image capture device 6. The movable unit formed by integrally assembling these components can be displaced in the direction orthogonal to the optical axis 4 relative to the fixed member 28.

As shown in FIG. 2B, as the coils 21 for driving, there are provided three coils (21a, 21b, and 21c). The coil 21a drives the movable member 20 in the x-axis direction and the coils 21b and 21c drive the same in the y-axis direction. With these three coils 21, the movable member 20 is displaceable in the x-axis direction and the y-axis direction, and further, rotationally displaceable about the z-axis.

The position detection sections 22 (22a, 22b, and 22c) are provided inside the coils 21a, 21b, and 21c, respectively. The position detection sections 22a, 22b, and 22c detect positions of the coils 21a, 21b, and 21c, respectively. Each position detection section 22 is formed e.g. by a Hall element, and detects a position of a corresponding one of the coils 21 by detecting a change in magnetic flux density within a magnetic field generated by magnets, described hereinafter, whereby the position of the movable member 20 is detected. The coils 21 and the position detection sections 22 are mounted on the flexible circuit board 23. The flexible circuit board 23 electrically connects between a driving circuit, not shown, and the movable member 20.

The camera-side shake correction unit 14 further includes a plurality of magnets 24 for driving, a first yoke 25, and a second yokes 29. The second yoke 29 is divided into two parts: a second yoke 29a opposed to the coil 21a and a second yoke 29b opposed to the coils 21b and 21c. However, the second yoke 29 is not necessarily required to be divided into the two parts. Spacers 27 are members for securing a fixed space between the fixed member 28 and the first yoke 25 which are fixed to each other. The spacers 27 also serve as a drive regulation section which is brought into abutment with the movable member 20 before the movable member 20 is displaced up to a drive limit area during driving. The drive limit area is a maximum range within which the coils 21 do not extend outside the area where the magnets 24 are arranged.

The camera-side shake correction unit 14 is provided with a total of twelve magnets 24. Magnets 24g to 24l of the magnets 24 are fixed to the fixed member 28 via the second yoke 29. The magnets 24g to 24l are inserted through openings formed in the fixed member 28, and the second yoke 29 is fixed to the fixed member 28 from a − (negative) side in the z-axis direction, whereby the positions of the magnets 24g to 24l are fixed. Magnets 24a to 24f are arranged on an opposite side from the fixed member 28 across the movable member 20 in the direction of the optical axis 4. Three rolling balls 26 as rolling members are arranged between the movable member 20 and the fixed member 28. The rolling balls 26 roll when the movable member 20 is driven with respect to the fixed member 28, whereby the movable member 20 can be displaced relative to the fixed member 28 with less friction.

Next, the roles of the above-described components when the movable member 20 is driven will be described. In a case where the movable member 20 is driven in the x-axis direction, the movable member 20 is driven in the x-axis direction by the coil 21a and the magnets 24a, 24b, 24g, and 24h, opposed to the coil 21a. By energizing the coil 21a arranged in a magnetic circuit formed by the magnets 24a, 24b, 24g, and 24h, the coil 21a receives the Lorentz force, whereby the movable member 20 is moved in the x-axis direction.

In a case where the movable member 20 is driven in the y-axis direction, the movable member 20 is driven in the y-axis direction by the coils 21b and 21c and the magnets 24c, 24d, 24e, 24f, 24i, 24j, 24k, and 24l, opposed to the coils 21b and 21c. By energizing the coil 21b arranged in a magnetic circuit formed by the magnets 24c, 24d, 24i, and 24j, the coil 21b receives the Lorentz force in the y-axis direction. Similarly, by energizing the coil 21c arranged in a magnetic circuit formed by the magnets 24e, 24f, 24k, and 24l, the coil 21c receives the Lorentz force in the y-axis direction. In a case where the coils 21b and 21c are energized to receive the forces in the same direction, the movable member 20 is translationally moved in the y-axis direction. In a case where the coils 21b and 21c are energized to receive the forces in the directions opposite to each other, respectively, the movable member 20 is rotationally moved about a rotational axis parallel to the z-axis direction. Therefore, the movable member 20 of the camera-side shake correction unit 14 can be translationally moved within a plane (x-y plane) orthogonal to the optical axis 4 and be rotationally moved about the z-axis direction.

Figure 3A:
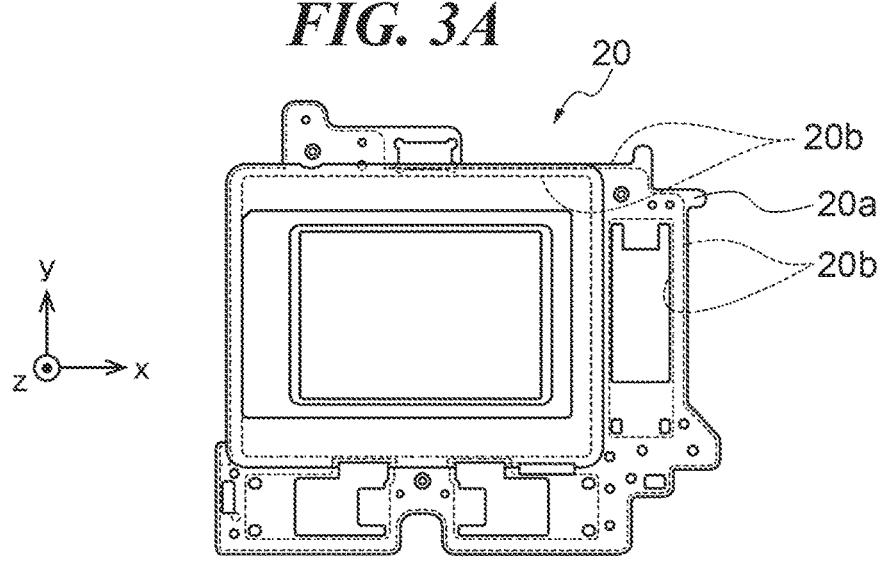
FIG. 3A is a view of a movable member, as viewed from a + (positive) side in a z-axis direction.
Figure 3B:
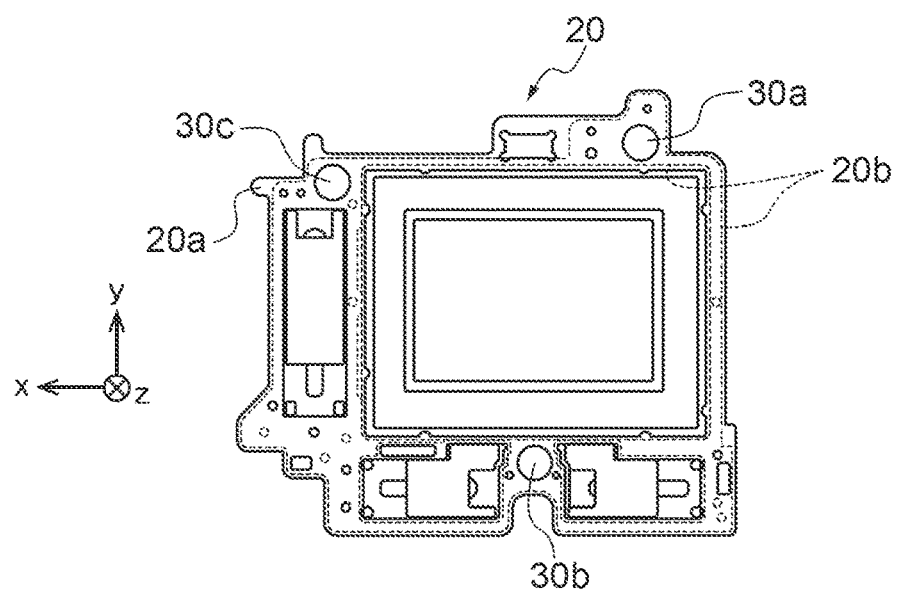
FIG. 3B is a view of the movable member, as viewed from a − (negative) side in the z-axis direction.
Figure 3C:
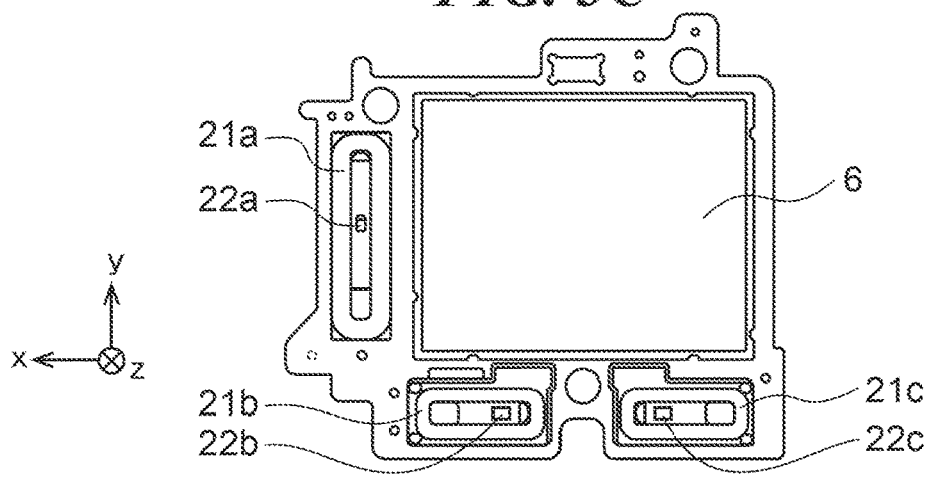
FIG. 3C is a view of the movable member, as viewed from the − (negative) side in the z-axis direction.

FIGS. 3A and 3B are views of the movable member 20, as viewed from the + (positive) side in the z-axis direction and the − (negative) side in the z-axis direction, respectively. FIG. 3C is a view of the movable unit including the movable member 20 and the image capture device 6, as viewed from the − (negative) side in the z-axis direction. Not only the movable unit, but also formation of rolling surfaces using an insert sheet metal will be described with reference to FIGS. 3A to 3C.

As shown in FIG. 3A, the movable member 20 has a resin part 20a and a sheet metal member 20b. In the movable member 20, the resin part 20a is molded integrally with the sheet metal member 20b. That is, the resin part 20a is molded integrally with the sheet metal member 20b by insert molding. In FIGS. 3A and 3B, part indicated by a broken line is the sheet metal member 20b. Basically (except the rolling surfaces, denoted by reference numeral 30, described hereinafter), the resin part 20a is molded integrally with the sheet metal member 20b such that the sheet metal member 20b is covered with the resin part 20a. The sheet metal member 20b is made of a metal having magnetism.

As shown in FIG. 3B, the movable member 20 is provided with the rolling surfaces 30 (30a, 30b, and 30c), which are brought into contact with the rolling balls 26, respectively. Each rolling surface 30 is part of the sheet metal member 20b, and in the movable member 20, parts exposed from the resin part 20a toward the − (negative) side in the z-axis direction form the rolling surfaces 30. The rolling surfaces 30 are provided in plural as the surfaces on which the rolling balls 26 roll when the movable member 20 is moved in the x-axis direction and the y-axis direction, and in the present embodiment, the three rolling surfaces 30 are formed on the movable member 20. When integrally forming the sheet metal member 20b and the resin part 20a, the rolling surfaces 30a to 30c are formed by causing portions of the sheet metal member 20b to be exposed from the resin part 20a.

The movable member 20 is brought into contact with the fixed member 28 via the rolling balls 26, and hence if the camera body 1 receives an impact, caused e.g. by dropping, the movable member 20 receives the impact from the fixed member 28 via the rolling balls 26. At this time, if flaws and dents are generated and remain in the rolling surfaces 30, each rolling ball 26 does not smoothly move where the flaws and dents are formed, during afterward shake correction, which adversely affects the shake correction. Therefore, the rolling surfaces 30 are required to have such hardness as will be resistant to impact. For this reason, in a case where the movable member 20 is made of a material having relatively low hardness, such as resin, it is necessary to additionally use a member having high hardness for a member forming the rolling surfaces 30. Conventionally, when forming the movable member of e.g. resin, there is mostly used a method of affixing a sheet metal having high hardness to the rolling surface as an additional member. However, in a case where the sheet metal is affixed, an additional affixing step is required, and further, a problem is caused that not only a component tolerance of the sheet metal as a single component but also an assembling tolerance due to e.g. oblique assembling of the component into the movable member 20 is included.

In the present embodiment, since the sheet metal member 20b is brought into contact with the rolling balls 26 on the rolling surfaces 30, the rolling surfaces 30 can have sufficient hardness to be resistant to impact. Further, since the resin part 20a is molded integrally with the sheet metal member 20b, the affixing step is not required to be included in the process for manufacturing the movable member 20, and further, it is possible to avoid variation of the rolling surfaces 30 due to affixing.

As is clear from comparison between FIG. 3C and FIG. 3B, the sheet metal member 20b is arranged such that it surrounds the image capture device 6, as viewed from the z-axis direction (or the direction of the optical axis 4). Thus, the sheet metal member 20b is formed into a shape surrounding the image capture device 6, whereby although the movable member 20 is mainly formed of resin, it is possible to increase the strength of the movable member 20. Particularly, when driving a relatively large component element of the image capture apparatus 1000, such as the image capture device 6 and a large optical member, if impact caused e.g. by dropping is received, a large force is applied to the movable member 20. Therefore, if the movable member 20 is formed only of resin, the movable member 20 cannot resist the impact, which causes deformation and breakage and can adversely affect a photographed image. To prevent this, the resin part 20a is molded integrally with the sheet metal member 20b, and the inserted sheet metal member 20b is arranged on the whole movable member 20 such that it surrounds the image capture device 6, whereby it is possible to increase the strength of the movable member 20 and thereby prevent deformation and breakage.

Further, by arranging the sheet metal member 20b such that it surrounds the image capture device 6, it is also possible to reduce noise (image deterioration) occurring on the image capture device 6. As described with reference to FIGS. 2A and 2B, the movable member 20 is driven by the Lorentz force generated by energizing the coils 21 arranged in the magnetic circuits formed by the magnets 24. At this time, a signal which is originally not expected to be imaged is sometimes generated in the image capture device 6 as noise (hereinafter referred to as the magnetic noise) due to the influence of the magnetic fields formed in the coils 21. However, since the sheet metal member 20b is arranged such that it surrounds the image capture device 6, the magnetic fields generated by the coils 21 are shielded by the sheet metal member 20b and hard to reach the image capture device 6. Thus, the arrangement of the sheet metal member 20b, surrounding the image capture device 6, also makes it possible to reduce the magnetic noise generated by energizing the coils 21.

Figure 4A:
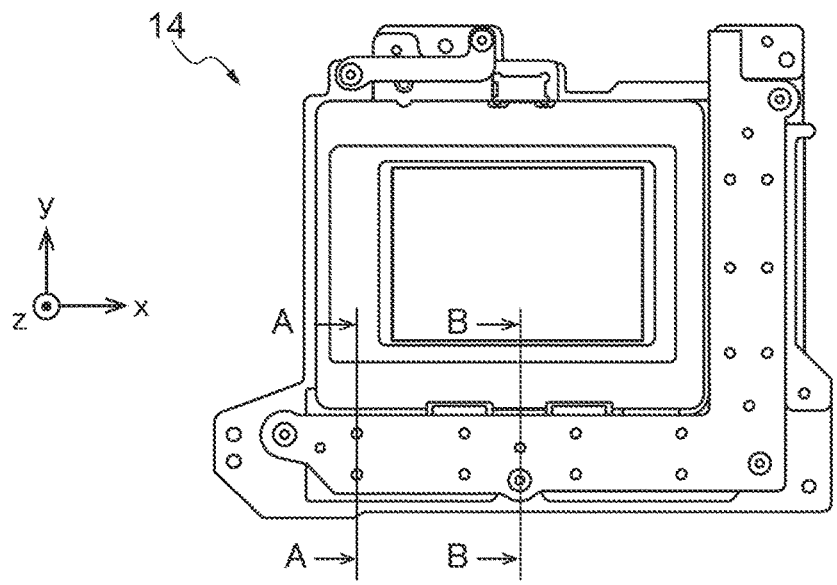
FIG. 4A is a view of the camera-side shake correction unit, as viewed from the + (positive) side in the z-axis direction.
Figure 4B:
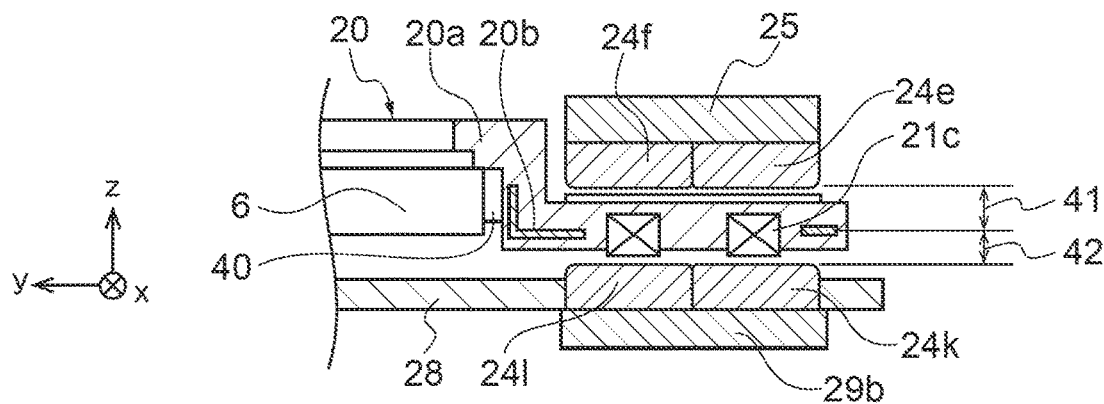
FIG. 4B is a view showing part of a cross-section taken along A-A in FIG. 4A.
Figure 4C:
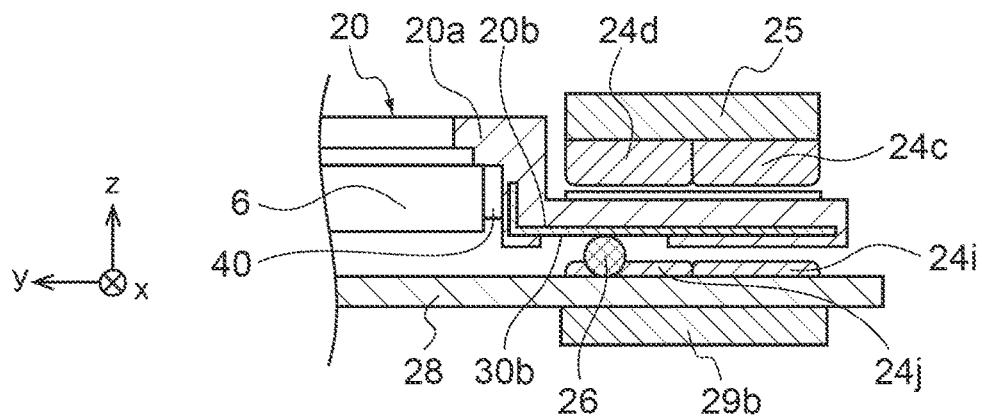
FIG. 4C is a view showing part of a cross-section taken along B-B in FIG. 4A.

Next, an urging mechanism (urging unit) of the camera-side shake correction unit 14 for urging the movable member 20 against the fixed member 28 will be described with reference to FIGS. 4A to 4C. FIG. 4A is a view of the camera-side shake correction unit 14, as viewed from the + (positive) side in the z-axis direction. FIGS. 4B and 4C are views showing part of a cross-section taken along A-A and part of a cross-section taken along B-B in FIG. 4A, respectively.

As shown in FIG. 4B, the image capture device 6 is fixedly mounted on the movable member 20 with an adhesive 40. With this, the movable member 20 fixedly holds the image capture device 6. A reason why a surface of the movable member 20, which is bonded to the image capture device 6 with the adhesive 40, is formed by the resin part 20a will be described. In general, when bonding components using an adhesive, it is necessary to provide a place where the adhesive is applied (hereinafter referred to as the adhesive pool). In general, the same image capture device 6 can be used for a lot of models, but on the other hand, the movable member 20 is designed on a model-by-model basis, and hence the adhesive pool is also designed on a model-by-model basis. For this reason, to make it possible to freely arrange the adhesive pool with a higher degree of freedom in shape, it is preferable that the bonding surface is formed by the resin part 20a.

Further, when the camera body 1 is exposed to a high-temperature or low-temperature environment, if a difference in the linear expansion coefficient is large between an outer periphery portion of the image capture device 6, as one bonding surface, and part of the movable member 20, as the other bonding surface, the image capture device 6 and the movable member 20 may warp in a direction opposite to each other. This is caused by occurrence of thermal distortion. If the image capture device 6 thus warps from the movable member 20, a problem is caused that the image capture device 6 tilts with respect to the optical axis 4 and hence tilts with respect to the image plane of the image capture apparatus 1000, which may cause blur in part of a photographed image. One solution for this problem is that the linear expansion coefficient of the bonding surface of the movable member 20, bonded to the image capture device 6, and the linear expansion coefficient of the bonding surface of the image capture device 6 are made closer to each other.

In the present embodiment, the movable member 20 is formed by the resin part 20a and the sheet metal member 20b. Assuming that the sheet metal member 21b is largely different in the linear expansion coefficient from the image capture device 6, it is preferable that the resin part 20a is formed by a resin material having a linear expansion coefficient close to that of the image capture device 6. Thus, considering the degree of freedom in selecting the material, it is also preferable to form the bonding surface of the movable member 20 where the image capture device 6 is bonded, by using the resin part 20a. As described above, from the viewpoint of the degree of freedom in shape and the viewpoint of the physical properties of the materials, it is preferable that the surface of the movable member 20 where the image capture device 6 is bonded is formed by the resin part 20a.

Next, the urging mechanism for urging the movable member 20 against the fixed member 28 will be described. As shown in FIG. 4C, the rolling balls 26 are arranged on the – (negative) side in the z-axis direction of the movable member 20. In this case, it is preferable that the movable member 20 is also urged toward the – (negative) side in the z-axis direction. In general, in a case where a fixed member and a movable member are urged, it is necessary to additionally arrange a member for urging them. However, in the present embodiment, an urging force is obtained by using magnetism of the sheet metal member 20b and the magnets 24.

The sheet metal member 20b is formed of magnetic material. As is clear from FIG. 4B, part of the sheet metal member 20b is opposed to the magnets 24, and hence the sheet metal member 20b is attracted by the magnets 24. The action of attracting the sheet metal member 20b by the magnets 24 is hereinafter referred to as the "magnetic attraction". Therefore, whether the movable member 20 is more strongly magnetically-attracted toward the first yoke 25 (+ (positive) side in the z-axis direction) or the second yoke 29b (– (negative) side in the z-axis direction) is determined depending on a distance from the sheet metal member 20b to the magnets 24 in the z-axis direction.

Here, reference numeral 41 in FIG. 4B indicates a distance from the sheet metal member 20b to the magnets 24e and 24f mounted on the first yoke 25. Reference numeral 42 indicates a distance from the sheet metal member 20b to the magnets 24k and 24l mounted the second yoke 29b. Note that when comparing these distances 41 and 42, the position of the sheet metal member 20b is represented by the position of the center of the sheet metal member 20b in a direction of the thickness thereof. In the present embodiment, the distance 42 is shorter than the distance 41. Therefore, the attraction force applied to the sheet metal member 20b is stronger on the – (negative) side in the z-axis direction than on the + (positive) side in the z-axis direction, and as a result, the movable member 20 is urged toward the fixed member 28. Further, similarly, the sheet metal member 20b is closer to the magnets 24g and 24h (see FIG. 2B) than to the magnets 24a and 24b. Therefore, it is possible to smoothly drive the rolling balls 26 on the rolling surfaces 30 with less loss caused by friction.

As described above, in the movable member 20, the resin part 20a is molded integrally with the sheet metal member 20b such that it is closer to the magnets 24 on the – (negative) side in the z-axis direction than to the magnets 24 on the + (positive) side in the z-axis direction. With this, the sheet metal member 20b not only provides the rolling surfaces 30, but also is capable of functioning as the urging mechanism.

According to the present embodiment, parts of the sheet metal member 20b in the movable member 20, exposed from the resin part 20a, form the rolling surfaces 30. This makes it possible to form the strong rolling surfaces on the movable member 20 including the resin part and reduce the number of steps for forming the rolling surfaces 30. Further, the movable member 20 is formed by molding the resin part 20a integrally the sheet metal member 20b, and the sheet metal member 20b is formed into the shape surrounding the image capture device 6, as viewed from the direction of the optical axis 4. This makes it possible to increase the strength of the movable member 20. What is more, it is possible to reduce magnetic noise caused by energization of the coils 21.

Further, the movable member 20 and the fixed member 28 are urged such that they are attracted to each other, by using part (magnetic portion) of the sheet metal member 20b. What is more, since the distance 42 is shorter than the distance 41, the movable member 20 is urged toward the fixed member 28. This makes it possible to simplify the manufacturing process by eliminating the need of an additional urging member for preventing the rolling balls 26 from falling off.

Further, the image capture device 6 is fixed to the resin part 20a of the movable member 20. This makes it possible to increase the degree of freedom in selecting the material and the shape, for the bonding surface where the image capture device 6 is bonded to the movable member 20.

An image capture apparatus according to a second embodiment of the present invention will be described with reference to FIGS. 5A to 5D. The present embodiment differs from the first embodiment in the components of the sheet metal member 20b of the movable member 20 and is basically the same in the other components as the first embodiment. Therefore, the description will be mainly given of the different points from the first embodiment.

Figure 5A:
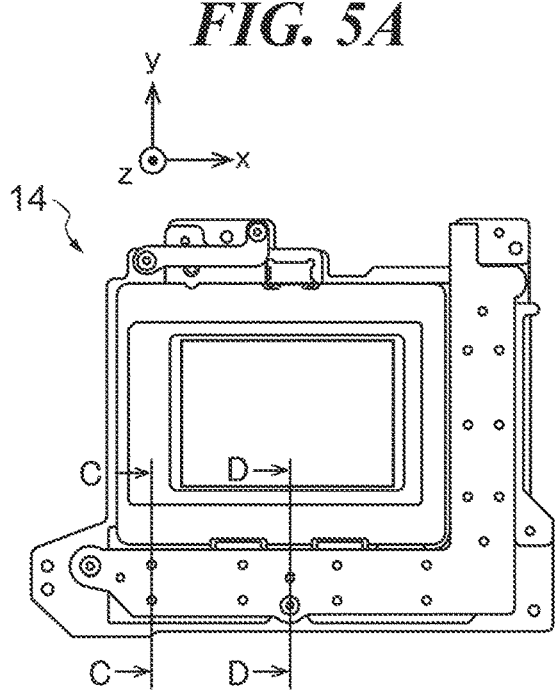
FIG. 5A is a view of the camera-side shake correction unit, as viewed from the + (positive) side in the z-axis direction.
Figure 5B:
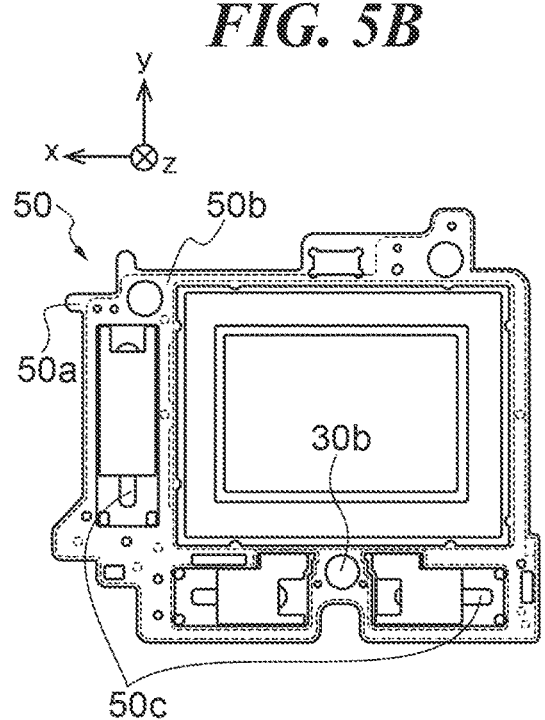
FIG. 5B is a view of the movable member, as viewed from the − (negative) side in the z-axis direction.
Figure 5C:
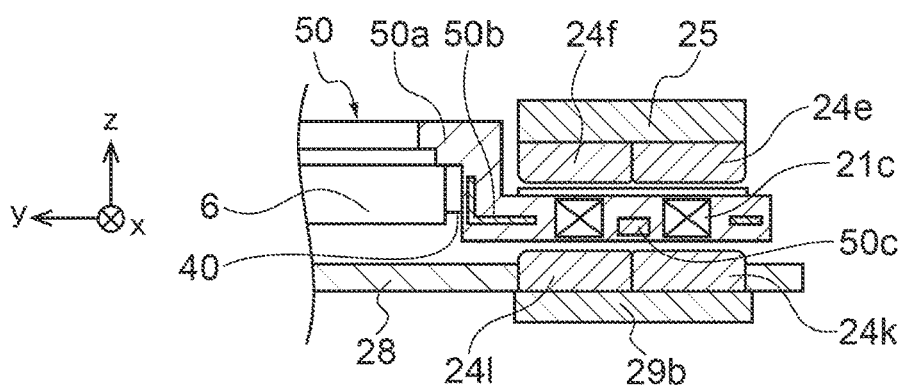
FIG. 5C is a view showing part of a cross-section taken along C-C in FIG. 5A.
Figure 5D:
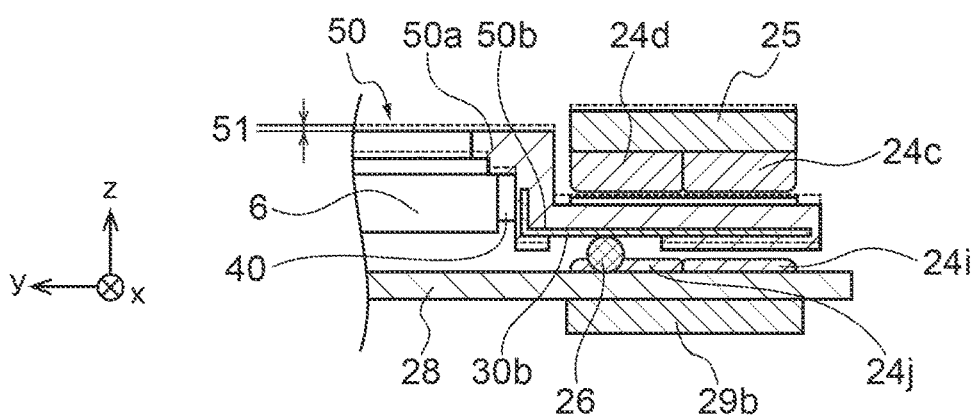
FIG. 5D is a view showing part of a cross-section taken along D-D in FIG. 5A.

FIG. 5A is a view of the camera-side shake correction unit 14, as viewed from the + (positive) side in the z-axis direction. FIG. 5B is a view of the movable member, as viewed from the – (negative) side in the z-axis direction. FIGS. 5C and 5D are views showing part of a cross-section taken along C-C in FIG. 5A and part of a cross-section taken along D-D in FIG. 5A, respectively.

The camera-side shake correction unit 14 includes the movable member, denoted by reference numeral 50. The movable member 50 includes not only a resin part 50a and a sheet metal member 50b, but also a magnetic sheet metal 50c for magnetic attraction. The movable member 50, the resin part 50a, and the sheet metal member 50b correspond to the movable member 20, the resin part 20a, and the sheet metal member 20b in the first embodiment, respectively. In the movable member 50, the resin part 50a is molded integrally with the sheet metal member 50b and the magnetic sheet metal 50c. Parts of the sheet metal member 50b are exposed to form the rolling surfaces 30a to 30c (only the rolling surface 30b is shown in FIG. 5D).

Although the sheet metal member 20b in the first embodiment is formed of magnetic material, the sheet metal member 50b is formed of non-magnetic material. On the other hand, the magnetic sheet metal 50c is formed of magnetic material. As shown in FIG. 5C, the magnetic sheet metal 50c is arranged such that the whole movable member 50 is attracted toward the − (negative) side in the z-axis direction. That is, a distance from the magnetic sheet metal 50c to the magnets 24 (24g to 24l) on the − (negative) side in the z-axis direction is shorter than a distance from the magnetic sheet metal 50c to the magnets 24 (24a to 24f) on the + (positive) side in the z-axis direction. Therefore, the movable member 50 is urged toward the fixed member 28.

Since the sheet metal member 50b is a non-magnetic body, the sheet metal member 50b is not attracted by the magnets 24. The urging force is caused by the magnetic sheet metal 50c, and hence it is unnecessary to arrange the sheet metal member 50b at a location remote from the magnets 24 on the + (positive) side in the z-axis direction. If this state is described by referring to the first embodiment (see FIG. 4B), it is unnecessary to make the distance 42 shorter than the distance 41. Compared with the first embodiment, it is possible to offset the movable member 50 toward the − (negative) side in the z-axis direction without changing the position of the rolling surfaces 30 in the z-axis direction. For example, as shown in FIG. 5D, it is possible to reduce the thickness of the movable member 50 by an amount corresponding to an offset amount 51. Accordingly, it is possible to offset the first yoke 25 and the magnets 24 (24a to 24f) fixed to the first yoke 25 toward the − (negative) side in the z-axis direction. As a result, it is possible to reduce the thickness of the camera-side shake correction unit 14 in the z-axis direction.

According to the present embodiment, it is possible to obtain the same advantageous effects as provided by the first embodiment, in forming the strong rolling surfaces 30, reducing the number of processing steps for forming the rolling surfaces 30, and increasing the strength of the movable member 50. Further, it is possible to obtain the urging force using the magnetic sheet metal 50c which is a member different from the sheet metal member 50b, and what is more, since the sheet metal member 50b is formed of non-magnetic material, this contributes to size reduction and thinning of the camera-side shake correction unit 14.

An image capture apparatus according to a third embodiment of the present invention will be described with reference to FIGS. 6A and 6B. The present embodiment differs from the first embodiment in the components of the urging mechanism for urging the movable member against the fixed member 28 in the camera-side shake correction unit, and is basically the same in the other components as the first embodiment. Therefore, the description will be mainly given of the different points from the first embodiment.

Figure 6A:
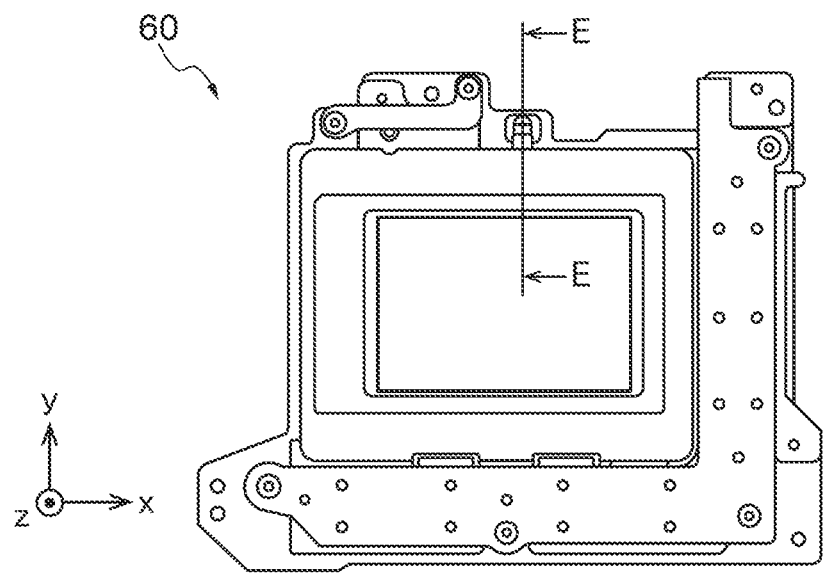
FIG. 6A is a view of the camera-side shake correction unit, as viewed from the + (positive) side in the z-axis direction.
Figure 6B:
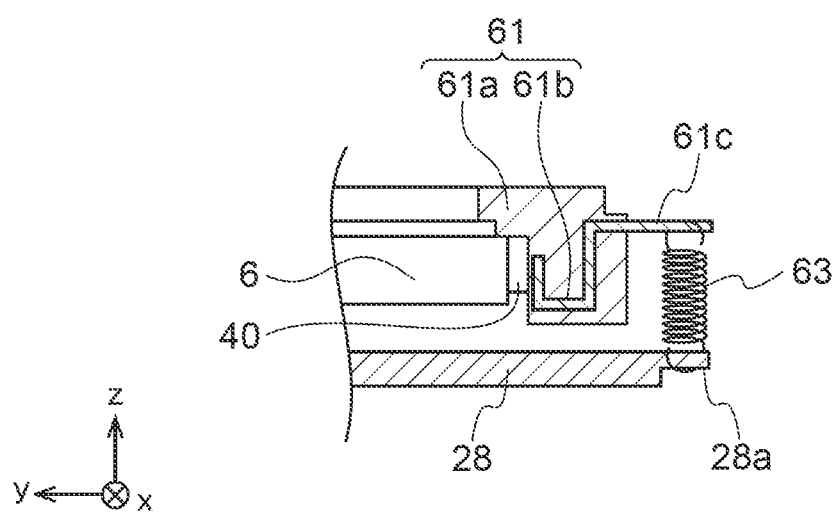
FIG. 6B is a view showing part of a cross-section taken along E-E in FIG. 6A.

FIG. 6A is a view of a camera-side shake correction unit, as viewed from the + (positive) side in the z-axis direction. FIG. 6B is a view showing part of a cross-section taken along E-E in FIG. 6A. The image capture apparatus according to the present embodiment includes the camera-side shake correction unit, denoted by reference numeral 60, which corresponds to the camera-side shake correction unit 14.

The camera-side shake correction unit 60 includes a movable member 61. The movable member 61 includes a sheet metal member 61b and a resin part 61a, and the resin part 61a is molded integrally with the sheet metal member 61b. The movable member 61, the resin part 61a, and the sheet metal member 61b correspond to the movable member 20, the resin part 20a, and the sheet metal member 20b in the first embodiment, respectively. Portions of the sheet metal member 61b are exposed to form the rolling surfaces 30 (not shown in FIGS. 6A and 6B).

An urging spring 63 is engaged between the movable member 61 and the fixed member 28. One end of the urging spring 63 is engaged with a spring hook portion provided 61c on the sheet metal member 61b, and the other end is engaged with a spring hook portion 28a provided on the fixed member 28. The locations on the movable member 61 and the fixed member 28, where the urging spring 63 is engaged, do not matter. The urging spring 63 is hooked in a tensioned state. Therefore, the movable member 61 and the fixed member 28 are urged in a direction attracted to each other. With this, it is unnecessary to use the sheet metal member for the urging mechanism. Therefore, the sheet metal member 61b may be formed of non-magnetic material.

According to the present embodiment, it is possible to obtain the same advantageous effects as provided by the first embodiment, in forming the strong rolling surfaces 30, reducing the number of processing steps for forming the rolling surfaces 30, and increasing the strength of the movable member 61. Further, since the movable member 61 and the fixed member 28 are urged by the urging spring 63, it is possible to simplify the urging mechanism without requiring to be configured such that a magnetic body is used therefor.

Note that the urging spring 63 may be provided in addition to the urging mechanism using the magnetic body in the first and second embodiments.

A fourth embodiment of the present invention will be described with reference to FIGS. 7A to 7C. The present embodiment differs from the first embodiment in the shape of the sheet metal member of the movable member 20, and is basically the same in the other components as the first embodiment. Therefore, the description will be mainly given of the different points from the first embodiment.

Figure 7A:
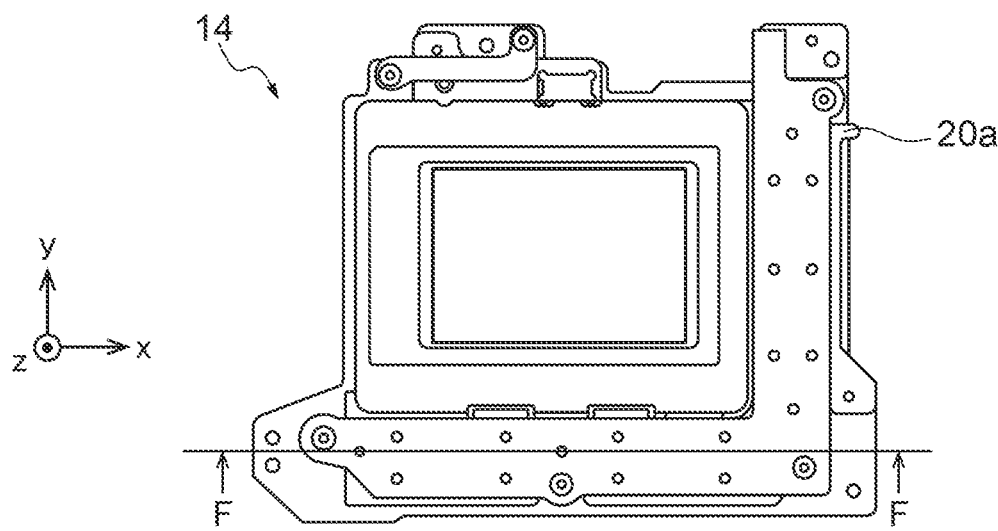
FIG. 7A is a view of the camera-side shake correction unit, as viewed from the + (positive) side in the z-axis direction.

FIG. 7A is a view of the camera-side shake correction unit 14, as viewed from the + (positive) side in the z-axis direction. FIG. 7B is a view showing part of a cross-section taken along F-F in FIG. 7A. Further, FIG. 7C is a view showing part of a cross-section of the camera-side shake correction unit 14 in the first embodiment, taken along F-F, as a comparative example. Detailed description of FIG. 7C is omitted.

The movable member 20 in the present embodiment includes the resin part 20a and a sheet metal member 70. The sheet metal member 70 corresponds to the sheet metal member 20b in the first embodiment, and is formed of a magnetic material. Referring to FIG. 7B, the sheet metal member 70 is bent at a bending portion 70a, and has a step portion formed at the bending portion 70a as a boundary. With this step portion, the other area than the area of the rolling surfaces 30 (only 30b is shown in FIG. 7B) is closer to the fixed member 28. In other words, part of the sheet metal member 70 which is opposed to the magnets 24 and used to urge the movable member 20 by magnetic attraction can be made closer to the magnets 24 (24g to 24l) on the − (negative) side in the z-axis direction, compared with the first embodiment. The part of the sheet metal member 70 opposed to the magnets 24, mentioned here, is the area other than the rolling surfaces 30, and it is better for the purpose of magnetic attraction that this part is closer to the magnets 24 on the − (negative) side in the z-axis direction. By forming the bending portion 70a, it is possible to position this part on the − (negative) side in the z-axis direction with respect to a + (positive) side end position of each rolling ball 26 in the z-axis direction.

Figure 7B:
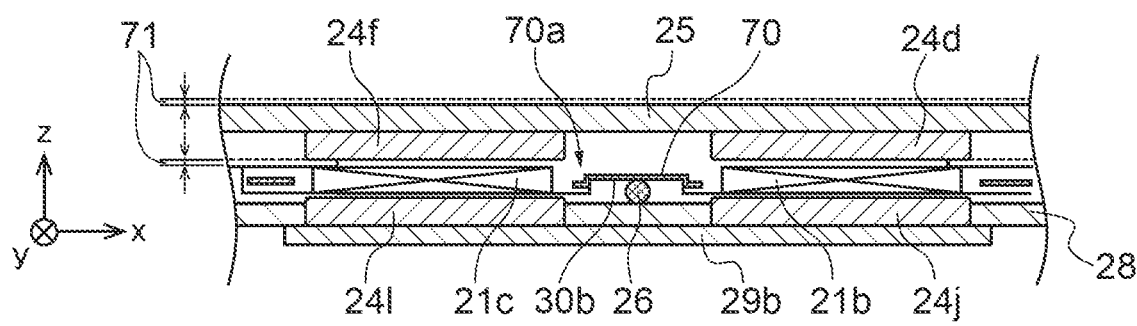
FIG. 7B is a view showing part of a cross-section taken along F-F in FIG. 7A.
Figure 7C:
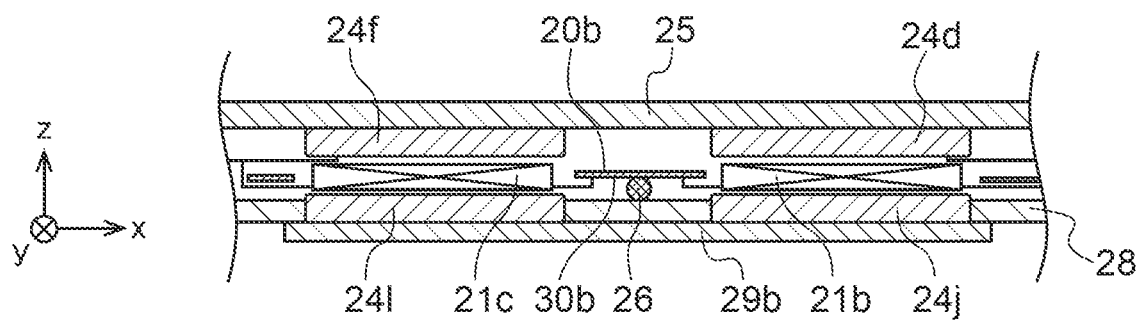
FIG. 7C is a cross-sectional view of a comparative example.

As a result, it is possible to reduce the thickness of the movable member 20 by an amount corresponding to an offset amount 71, indicated in FIG. 7B. Accordingly, it is also possible to offset the first yoke 25 and the magnets 24 (24a to 24f) fixed to the first yoke 25 toward the − (negative) side in the z-axis direction. As a result, it is possible to reduce the thickness of the camera-side shake correction unit 14 in the z-axis direction.

According to the present embodiment, it is possible to obtain the same advantageous effects as provided by the first embodiment, in forming the strong rolling surfaces 30, reducing the number of processing steps for forming the rolling surfaces 30, and increasing the strength of the movable member 20. Further, since the sheet metal member 70 is formed with the step (bending portion 70a), and the part of the sheet metal member 70, other than the rolling surfaces 30, is closer to the fixed member 28 in the direction of the optical axis 4, this contributes to size reduction and thinning of the camera-side shake correction unit 14.

A fifth embodiment of the present invention will be described with reference to FIGS. 8A and 8B. The present embodiment differs from the first embodiment in the components of the movable member 20, and is basically the same in the other components as the first embodiment. Therefore, the description will be mainly given of the different points from the first embodiment.

In general, a problem is known that if there is fine dust on the image capture device in the image capture apparatus, an image of the dust is included in a photographed image. As a countermeasure for this, a dust removing mechanism is sometimes employed that includes a cover glass provided on an object side of the image capture device and conveys and removes fine dust by vibrating the cover glass. In the present embodiment, this dust removing mechanism is employed.

Figure 8A:
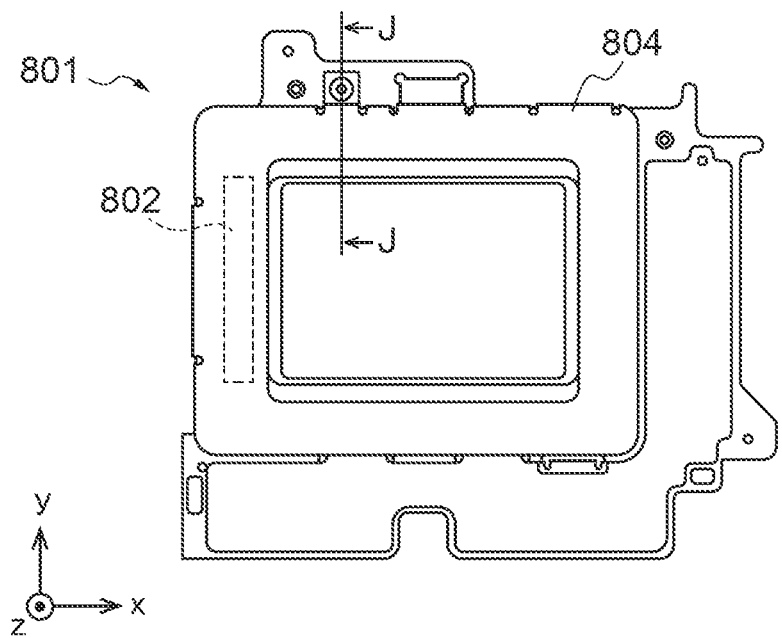
FIG. 8A is a view of the movable member, as viewed from the +(positive) side in the z-axis direction.
Figure 8B:
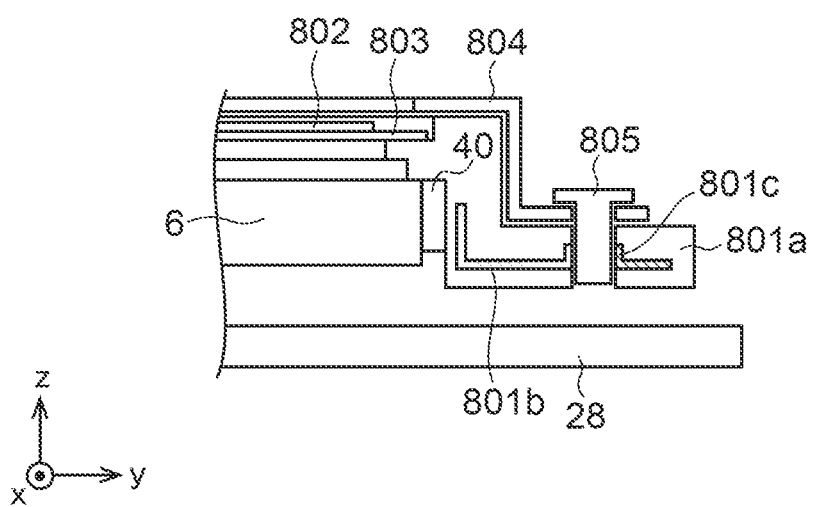
FIG. 8B is a cross-sectional view taken along J-J in FIG. 8A.

FIG. 8A is a view of a movable member 801, as viewed from the +(positive) side in the z-axis direction. FIG. 8B is a cross-sectional view taken along J-J in FIG. 8A. Note that the same component elements as those of the first embodiment are denoted by the same reference numerals. The movable member 801, a resin part 801a, and a sheet metal member 801b correspond to the movable member 20, the resin part 20a, and the sheet metal member 20b in the first embodiment, respectively.

The movable member 801 includes a piezoelectric element 802, a vibration member 803, and an electrically conductive member 804. The vibration member 803 is a member in which vibrations are excited by the piezoelectric element 802. The piezoelectric element 802 is fixed to the vibration member 803. The vibration member 803 is arranged such that it covers the whole area of the image capture device 6 from the object side of the image capture device 6 in the direction of the optical axis 4 (opposite side from the fixed member 28 in the direction of the optical axis 4). The vibration member 803 is a cover member which has the same function as the cover glass of the above-described dust removing mechanism. That is, the vibration member 803 plays a role of preventing attachment of fine dust to the image capture device 6. The vibration member 803 is vibrated by the piezoelectric element 802, whereby it is possible to remove fine dust attached to the vibration member 803.

The electrically conductive member 804 places the piezoelectric element 802 and the vibration member 803 in a state fixed to the resin part 801a, and has a function of electrically connecting the piezoelectric element 802 and the vibration member 803 to the sheet metal member 801b. An electrical conduction screw 805 as a fastening member is electrically conductive and electrically connects between the electrically conductive member 804 and the sheet metal member 801b. The sheet metal member 801b has an electrically conductive connection portion 801c. The electrically conductive connection portion 801c is formed e.g. by bending or burring the sheet metal member 801b such that its height in the direction of the optical axis 4 is secured. The electrically conductive connection portion 801c is formed with a female screw into which a male screw of the electrical conduction screw 805 is screwed.

The male screw of the electrical conduction screw 805 is screwed into the female screw of the electrically conductive connection portion 801c of the sheet metal member 801b via the resin part 801a, whereby the electrically conductive member 804 is fixed to the resin part 801a and the sheet metal member 801b together with the piezoelectric element 802 and the vibration member 803. Further, the electrical conduction screw 805 and the electrically conductive connection portion 801c are brought into contact with each other, whereby the vibration member 803 is electrically connected to the sheet metal member 801b via the electrically conductive member 804.

Incidentally, in general, it is known that the piezoelectric element generates static electricity due to its property of repeating expansion and compression at high speed. This causes a problem that the static electricity attracts fine dust around the piezoelectric element. To solve this problem, there is a conventionally known configuration for removing static electricity generated in the piezoelectric element, in which an electrically conductive member is provided around the piezoelectric element and the electrically conductive member is connected to a large metallic member. The present embodiment employs this configuration.

As described above, in the present embodiment, the movable member 801 is formed by integrally molding the resin part 801a with the sheet metal member 801b. Therefore, it is preferable to provide the electrically conductive member 804 around the piezoelectric element 802 and electrically connect the electrically conductive member 804 to the sheet metal member 801b. For this reason, the electrically conductive member 804 is formed into a shape surrounding the piezoelectric element 802, as viewed from the direction of the optical axis 4. Further, the electrically conductive member 804 and the sheet metal member 801b are connected at the electrically conductive connection portion 801c via the electrical conduction screw 805. This makes it possible to eliminate static electricity generated in the piezoelectric element 802.

According to the present embodiment, it is possible to obtain the same advantageous effects as provided by the first embodiment, in forming the strong rolling surfaces 30, reducing the number of processing steps for forming the rolling surfaces 30, and increasing the strength of the movable member 801.

Further, even in a case where the piezoelectric element 802 and the vibration member 803 are provided to remove fine dust, it is possible to eliminate static electricity by electrically connecting between the electrically conductive member 804 and the sheet metal member 801b.

Next, a sixth embodiment of the present invention will be described. Although in the first to fifth embodiments, the image blur correction device is applied to the camera body 1, in the sixth embodiment of the present invention, the image blur correction device is applied to the lens barrel 2.

More specifically, the present invention is applied to the lens-side shake correction unit 13a (see FIGS. 1A and 1B).

Figure 9A:
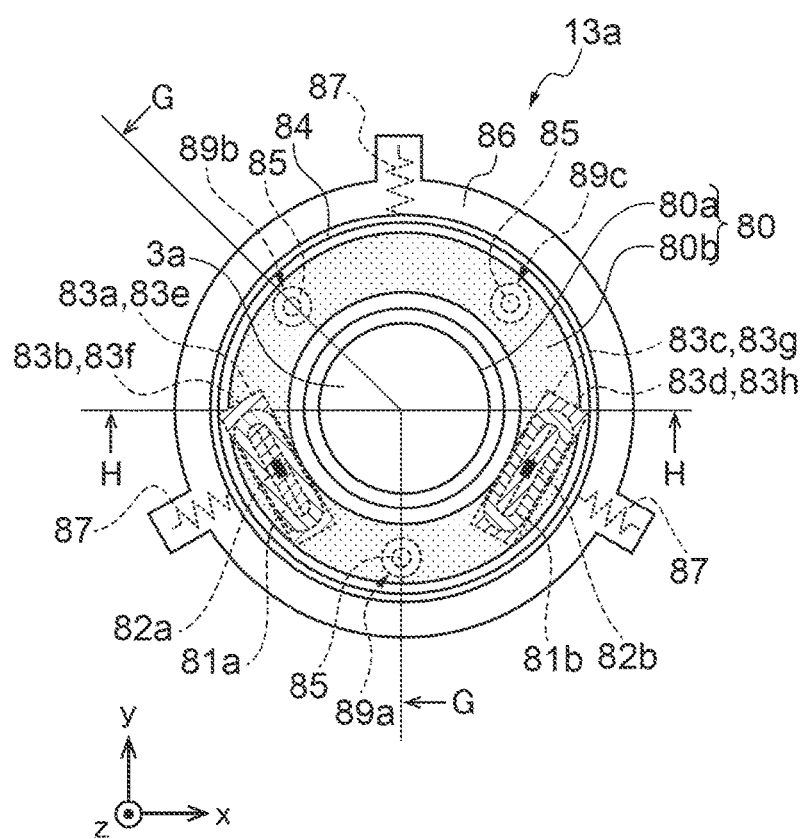
FIG. 9A is a view of a lens-side shake correction unit, as viewed from the + (positive) side in the z-axis direction.
Figure 9B:
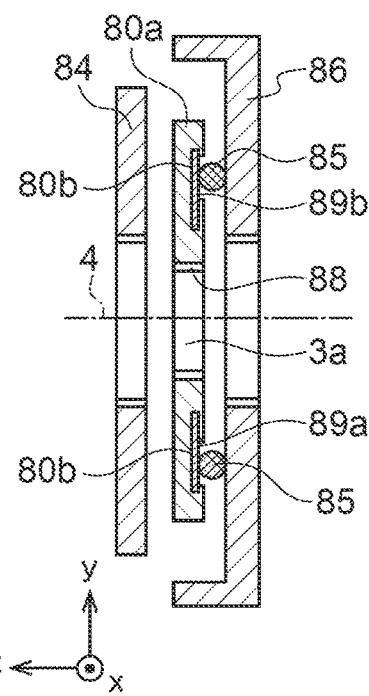
FIG. 9B is a cross-sectional view taken along G-G in FIG. 9A.
Figure 9C:
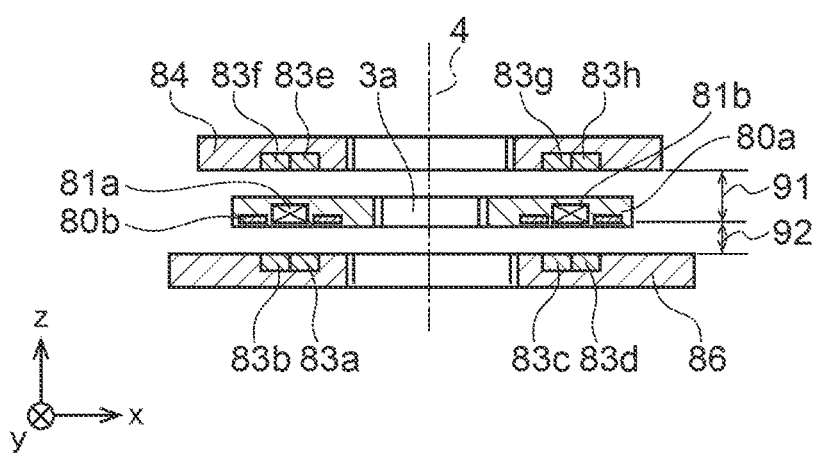
FIG. 9C is a cross-sectional view taken along H-H in FIG. 9A.

FIG. 9A is a view of the lens-side shake correction unit 13a, as viewed from the + (positive) side in the z-axis direction. FIGS. 9B and 9C are cross-sectional views taken along G-G and H-H in FIG. 9A, respectively.

A movable member 80 includes a resin part 80a and a sheet metal member 80b. The resin part 80a is molded integrally with the sheet metal member 80b. The shake correction lens 3a is fixed to the movable member 80 and can be displaced in accordance with driving of the movable member 80. The movable member 80 includes coils 81 (81a and 81b), position detection sections 82 (82a and 82b), magnets 83 (83a to 83h), a yoke 84, rolling balls 85, a fixed member 86, an adhesive 88, rolling surfaces 89 (89a, 89b and 89c), and an optical axis urging spring 87 for holding the movable member 80 at the center of the optical axis 4. The coils 81, the position detection sections 82, the magnets 83, and the yoke 84 of the movable member 80 correspond to the coils 21, the position detection sections 22, the magnets 24, and the first yoke 25 of the movable member 20 (see FIG. 4B and the like), respectively. The rolling balls 85, the fixed member 86, the adhesive 88, and the rolling surfaces 89 of the movable member 80 correspond to the rolling balls 26, the fixed member 28, the adhesive 40, and the rolling surfaces 30 of the movable member 20, respectively.

In the movable member 80, the position detection sections 82 (82a and 82b) are provided in association with the coils 81 (81a and 81b). The movable member 80 includes the eight magnets 83 formed by a group of the magnets 83a, 83b, 83e, and 83f which are arranged in an opposed relation to the coil 81a, and a group of the magnets 83c, 83d, 83g, and 83h which are arranged in an opposed relation to the coil 81b. By energizing the coils 81 arranged in magnetic circuits generated by these magnets 83, the movable member 80 receives the Lorentz force, whereby it is translationally movable in the x-axis direction and the y-axis direction.

Each rolling surface 89 is part of the sheet metal member 80b exposed from the resin part 80a of the movable member 80 and is brought into contact with the rolling ball 85. The rolling surfaces 89 are provided at three locations (rolling surfaces 89a, 89b, and 89c). Further, as is clear from FIGS. 9A and 9B, the sheet metal member 80b is arranged such that it surrounds the shake correction lens 3a as the optical element, as viewed from the direction of the optical axis 4. This increases the strength of the movable member 80. Further, a bonding surface of the movable member 80, bonded to the shake correction lens 3a with the adhesive 88, is formed by the resin part 80a.

As shown in FIG. 9B, the rolling balls 85 are arranged on the − (negative) side in the z-axis direction of the movable member 80. Therefore, it is preferable that the movable member 80 is urged toward the − (negative) side in the z-axis direction. To this end, similar to the first embodiment, the urging mechanism using magnetism of the sheet metal member 80b is provided. Here, reference numeral 91 in FIG. 9C indicates a distance from the sheet metal member 80b to the magnets 83e to 83h in the direction of the optical axis 4. Reference numeral indicates a distance 92 from the sheet metal member 80b to the magnets 83a to 83d. The distance 92 is shorter than the distance 91. Therefore, the attraction force applied to the sheet metal member 80b is stronger on the − (negative) side in the z-axis direction than on the + (positive) side in the z-axis direction, and as a result, the movable member 80 is urged toward the fixed member 86.

According to the present embodiment, in the lens-side shake correction unit 13a of the lens barrel 2, it is possible to obtain the same advantageous effects as provided by the first embodiment, in forming the strong rolling surfaces 89, reducing the number of processing steps for forming the rolling surface 89, and increasing the strength of the movable member 80.

Note that at least one of the characteristic features of the image blur correction device applied to the camera body 1, described as the second to fifth embodiments, may be employed in the image blur correction device applied to the lens barrel 2 of the present embodiment. Further, two or more of the first to fifth embodiments may be appropriately combined, insofar as no inconsistency occurs when realizing the combination.

Note that when considering an object to which the present invention is applied, the camera body 1 having the image blur correction function may be regarded as the "image capture apparatus". Further, the present invention may be applied to both of the image blur correction devices of the camera body 1 and the lens barrel 2.

Note that in the above-described embodiments, the image blur correction function is provided in both of the camera body 1 and the lens barrel 2. In a case where the present invention is applied to the camera body 1 as a single unit, the camera-side shake correction unit 14 is needed. In a case where the present invention is applied to the lens barrel 2 as a single unit, the lens-side shake correction unit 13a is needed. However, in a case where the present invention is applied to a lens-integrated type image capture apparatus, the image blur correction function may be provided in at least one of the camera body 1 and the lens barrel 2.

Figure 10A:
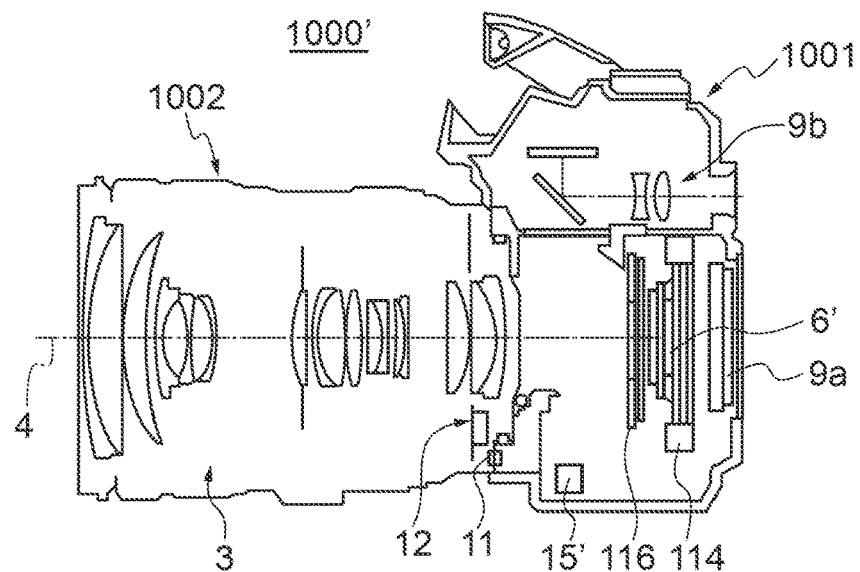
FIG. 10A is a cross-sectional view of an image capture apparatus to which an image blur correction device according to a seventh embodiment of the present invention is applied.
Figure 10B:
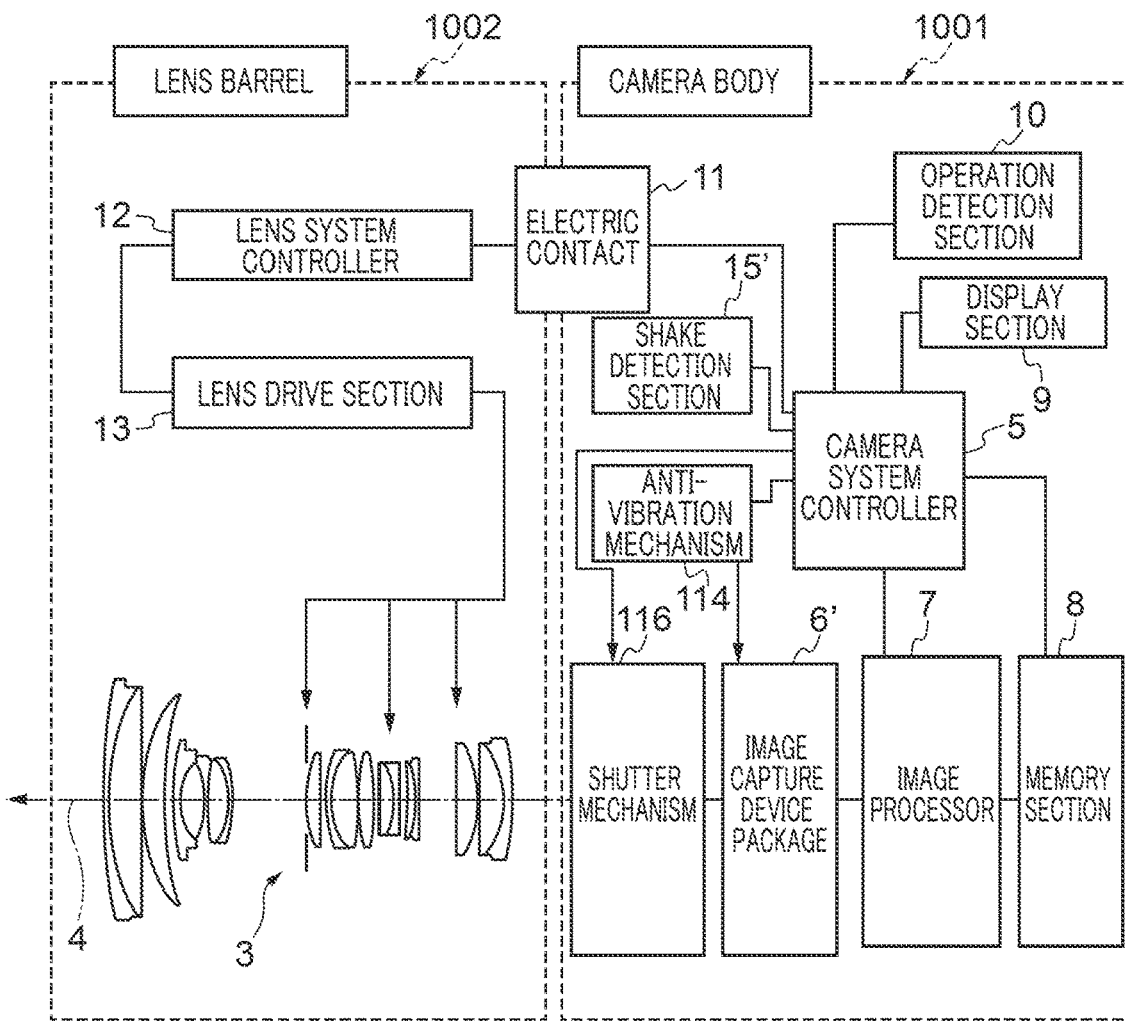
FIG. 10B is a block diagram showing an electrical configuration of the image capture apparatus to which the image blur correction device is applied.

FIG. 10A is a cross-sectional view of an image capture apparatus to which an image blur correction device according to a seventh embodiment of the present invention is applied. FIG. 10B is a block diagram showing an electrical configuration of the image capture apparatus, denoted by reference numeral 1000'. Component elements in the present embodiment, corresponding to those of the first embodiment described with reference to FIGS. 1A and 1B, are denoted by the same reference numerals. This image capture apparatus 1000' is formed by a camera body 1001, and a lens barrel 1002. The lens barrel 1002 is removable from the camera body 1001 and the image capture apparatus 1000' is a so-called lens interchangeable camera. Note that the camera body 1001 and the lens barrel 1002, which are fixed to each other and cannot be removed from each other, may be regarded as the image capture apparatus, and the present invention can be applied to this image capture apparatus.

The lens barrel 1002 includes the photographing optical system 3, the lens system controller 12, and the lens drive section 13. The photographing optical system 3 is formed by a plurality of lenses. The lens drive section 13 is capable of driving the focus lens, the shake correction lens, the diaphragm, and so forth.

The camera body 1001 includes the camera system controller 5, the image processor 7, the memory section 8, the display section 9, the operation detection section 10, a shake detection section 15', an anti-vibration mechanism 114, an image capture device package 6', a shutter mechanism 116, and the electric contact 11. The image capture device package 6' includes an image sensor 6a (see FIG. 12A) as an image capture device that photoelectrically converts an optical image formed through the lens barrel 1002. The display section 9 includes the rear-side display device 9a provided on the rear side of the camera body 1001 and the EVF (electronic viewfinder) 9b provided within the finder of the camera body 1001. The operation detection section 10 detects signals output from an operation section including a shutter release button, not shown, and so forth. The electric contact 11 is for communication between the camera body 1001 and the lens barrel 1002.

The shake detection section 15' is formed by a plurality of inertial sensors, and is capable of detecting displacement of the camera body 1001, such as movement and rotation. More specifically, the shake detection section 15' is formed by an accelerometer, a vibrating gyroscope, and so forth. The anti-vibration mechanism 114 is a mechanism for translationally moving the image capture device package 6' within a plane orthogonal to the optical axis 4 (photographing optical axis) of the photographing optical system 3, and rotating the same about the optical axis 4. Details of the structure of the anti-vibration mechanism 114 will be described hereinafter. A shake correction unit is formed by the anti-vibration mechanism 114, the shake-detection section 15', and the camera system controller 5 that controls these components.

The image capture apparatus 1000' formed by the camera body 1001 and the lens barrel 1002 includes an image capture unit, an image processing unit, a recording/reproduction unit, and a control unit. The image capture unit mentioned here includes the photographing optical system 3, the image capture device package 6', and the shutter mechanism 116. The image processing unit includes the image processor 7. Further, the recording/reproduction unit includes the memory section 8 and the display section 9. The control unit includes the camera system controller 5, the operation detection section 10, the lens system controller 12, the lens drive section 13, the anti-vibration mechanism 114, and the shake detection section 15'.

The above-mentioned image capture unit is an optical processing system configured to form through the photographing optical system 3 an image of light from an object on an image plane of the image capture device package 6'. A focus evaluation amount and a proper exposure amount can be obtained from the image capture device package 6' and the photographing optical system 3 is properly adjusted based on signals thereof, whereby the image capture device package 6' is exposed to an object light with a proper light amount to form an object image at or in the vicinity of the image capture device package 6'.

The shutter mechanism 116 controls running of a shutter curtain to thereby control whether or not to cause the object image to reach the image capture device package 6'. The shutter mechanism 116 includes at least a curtain (mechanical rear curtain) for shielding an object image, and exposure is completed by the operation of the shutter mechanism 116. The camera body 1001 has a mode (electronic front curtain mode) in which the timing of starting exposure is controlled by the image capture device package 6' resetting charges on a line-by-line basis before running the rear curtain of the shutter mechanism 116. The camera body 1001 performs, in the electronic front curtain mode, exposure control by causing the electronic front curtain of the image capture device package 6' for resetting charge and the rear curtain of the shutter mechanism 116 to operate in synchronism with each other. A lot of prior arts related to the electronic front curtain have already been disclosed and hence description thereof is omitted.

The image processor 7 incorporates an analog-to-digital converter, a white balance adjustment circuit, a gamma correction circuit, an interpolation calculation circuit, and so forth, and is capable of generating an image for recording. A color interpolation processor is included in the image processor 7, and generates a color image by performing color interpolation (demosaicing) on Bayer signals. Further, the image processor 7 compresses a still image, a moving image, sound, and so forth, using a predetermined method.

The memory section 8 includes a storage medium. The camera system controller 5 outputs an image to the memory section 8, and displays an image to be presented to a user on the display section 9. The camera system controller 5 generates and outputs a timing signal, and so forth, for use in image capture. The camera system controller 5 controls the image capture system, the image processing system, and the recording and reproduction system, in response to an external operation. For example, when it is detected by the operation detection section 10 that the shutter release button, not shown, has been pressed, the camera system controller 5 controls driving of the image capture device 6, the operations of the image processor 7, including compression processing, and so forth. Further, the camera system controller 5 controls the state of each segment on the display section 9. Note that the rear-side display device 9a is implemented by a touch panel and is connected to the operation detection section 10.

The operation for adjusting the optical system will be described. The image processor 7 is connected to the camera system controller 5, and the camera system controller 5 determines an appropriate focus position and a diaphragm position based on signals output from the image capture device package 6'. More specifically, the camera system controller 5 performs photometry and ranging operations based on the signals output from the image capture device package 6', and determines exposure conditions (an F-number, a shutter speed, etc.). The camera system controller 5 sends commands to the lens system controller 12 via the electric contact 11 and the lens system controller 12 properly controls the lens drive section 13. Further, in a mode for performing shake correction, the camera system controller 5 controls the lens drive section 13 to properly control the shake correction lens based on signals obtained from the image capture device package 6'.

Further, as described above, the camera system controller 5 and the lens system controller 12 controls the operations of the components of the camera body 1001 and the lens barrel 1002 according to user operations performed on respective operation sections provided on the camera body 1001 and the lens barrel 1002. With this, it is possible to photograph a still image and a moving image.

A brief description will be given of a flow of the shake correction control. As described above, the shake correction unit is formed by the shake detection section 15' that detects a shake, the anti-vibration mechanism 114 that performs the shake correction operation, and the camera system controller 5 that generates an operation target value of the anti-vibration mechanism 114 based on signals output from the shake detection section 15' and controls the driving of the anti-vibration mechanism 114. The operation detection section 10 detects a user operation of half-pressing the shutter release button, not shown, to start a photographing preparation operation. This photographing preparation operation is a so-called aiming operation for determining the composition. In the photographing preparation operation, to make it easy to determine the composition, the camera system controller 5 performs an anti-vibration operation using the anti-vibration mechanism 114. More specifically, the camera system controller 5 realizes anti-vibration by properly controlling the anti-vibration mechanism 114 based on signals output from the shake detection section 15'. After that, the operation detection section 10 detects a user operation of fully pressing the shutter release button to start the photographing operation. In the photographing operation, to suppress blur of an object image acquired by the exposure operation, the camera system controller 5 performs the anti-vibration operation using the anti-vibration mechanism 114. When a certain time period has elapsed after the exposure operation, the anti-vibration operation is stopped.

Figure 11:
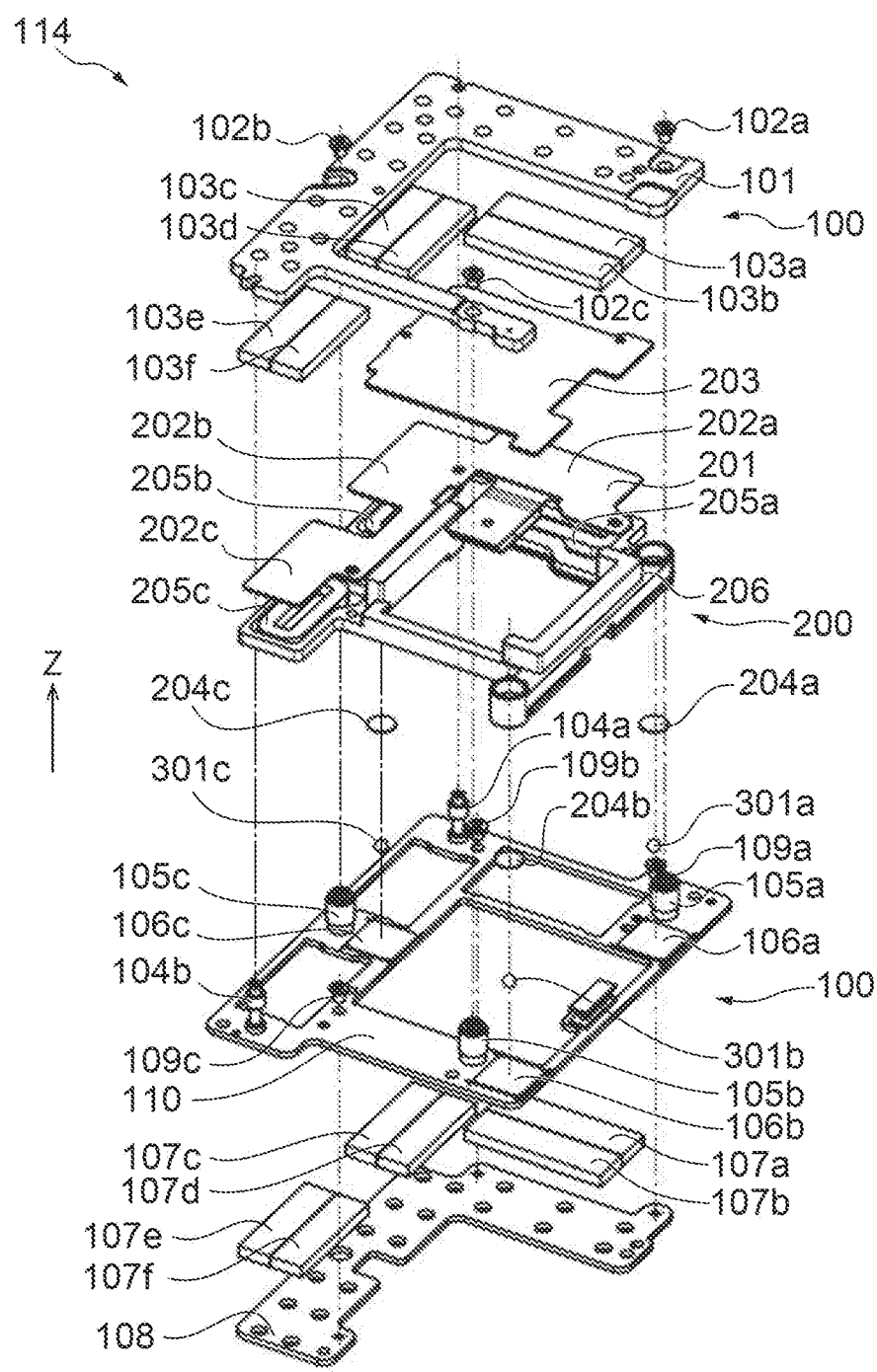
FIG. 11 is an exploded perspective view of essential parts of an anti-vibration mechanism.

FIG. 11 is an exploded perspective view of a mechanism for correcting a shake, which is included in the anti-vibration mechanism 114. Although the anti-vibration mechanism 114 has an electric mechanism additionally provided for execution of control, the electric mechanism is omitted from illustration. Referring to FIG. 11, a direction alone vertical dashed-dotted lines is parallel to the optical axis 4. The description is given defining the direction of the optical axis 4 (photographing optical axis direction) as the z-axis direction. The + (positive) side in the z-axis direction is the object side.

A member group not displaced in shake correction is a fixed unit 100, and in FIG. 11, component elements of the member group which are not displaced are denoted by reference numerals in 100s. A member group displaced in shake correction is a movable unit 200, and in FIG. 11, component elements of the member group which are displaced are denoted by reference numerals in 200s. Further, rolling members sandwichingly held between the fixed unit 100 and the movable unit 200 are balls 301 (301a, 301b, and 301c).

The anti-vibration mechanism 114 includes an upper yoke 101, screws 102 (102a, 102b, and 102c), upper magnets 103 (103a, 103b, 103c, 103d, 103e, and 103f), and auxiliary spacers 104 (104a and 104b). Further, the anti-vibration mechanism 114 includes main spacers 105 (105a, 105b, and 105c), fixed unit rolling plates 106 (106a, 106b, and 106c), and lower magnets 107 (107a, 107b, 107c, 107d, 107e, and 107f). Further, the anti-vibration mechanism 114 includes a lower yoke 108, screws 109 (109a, 109b, and 109c), a base plate 110, an FPC (flexible circuit board) 201, a movable PCB (electric wiring board) 203, and movable unit rolling plates 204 (204a, 204b, and 204c). Further, the anti-vibration mechanism 114 includes coils 205 (205a, 205b, and 205c), a movable frame 206 (holding member), and the balls 301a, 301b, and 301c.

The upper yoke 101, the upper magnets 103, the lower magnets 107, and the lower yoke 108 form magnetic circuits, and these components form so-called closed magnetic circuits. The upper magnets 103 are fixedly bonded to the upper yoke 101 in an attracted state. Similarly, the lower magnets 107 are fixedly bonded to the lower yoke 108 in an attracted state. The upper magnets 103 and the lower magnets 107 are each magnetized in the direction of the optical axis 4 (vertical direction, as viewed in FIG. 11). The magnets adjacent to each other (such as the upper magnet 103a and the upper magnet 103b, and magnets having the same positional relationship as these) of the upper magnets 103 and the lower magnets 107 are magnetized in directions different from each other. Further, the magnets, opposed to each other (such as the upper magnet 103a and the lower magnet 107a, and magnets having the same positional relationship as these) are magnetized in the same direction. By magnetizing the magnets as described above, a strong magnetic flux density is generated in the optical axis direction between the upper yoke 101 and the lower yoke 108.

Since a strong attraction force is generated between the upper yoke 101 and the lower yoke 108, a proper space is secured between the upper yoke 101 and the lower yoke 108 by the main spacers 105 and the auxiliary spacers 104. The proper space mentioned here is a space which makes it possible to arrange the coils 205 and the FPC 201 between the upper magnets 103 and the lower magnets 107, and secure a proper gap. The main spacers 105 are each formed with a screw hole, and the upper yoke 101 is fixed to the main spacers 105 by the corresponding screws 102. Rubber is arranged on a body portion of each main spacer 105, and this rubber functions as a regulating portion (so-called stopper) when the movable unit 200 is displaced The base plate 110 is formed with openings such that the lower magnets 107 can be received therein and the surfaces of the lower magnets 107 protrude from these openings. Each lower magnet 107 is thicker than the base plate 110. When the base plate 110 and the lower yoke 108 are fixed by the screws 109, the lower magnets 107, lamer in the dimension in the thickness direction than the base plate 110, protrude from the base plate 110 toward the + (positive) side in the z-axis direction.

The movable frame 206 is formed of resin containing a large amount of a plasticizer and is light in weight and high in rigidity. Further, the movable frame 206 has a low linear expansion coefficient. The linear expansion coefficient will be explained hereinafter with reference to FIGS. 12A to 12C. The movable unit 200 is formed by fixing a plurality of component elements to the movable frame 206. The FPC 201 has position detection elements, disposed on a surface on a side hidden in FIG. 11 (the − (negative) side in the z-axis direction), at respective locations indicated by mounting positions 202a, 202b, and 202c. Each position detection element employs e.g. a Hall element so as to make it possible to perform position detection using the above-mentioned magnetic circuit. The Hall element is small-sized, and hence the position detection elements are arranged in a state nested within the coils 205a, 205b, and 205c, respectively.

The movable PCB 203 forms part of the image capture device package 6', as described hereinafter. Further, the coils 205 and the above-mentioned position detection elements are connected to the movable PCB 203. Electrical communication is performed with the outside via a connector on the movable PCB 203. The fixed unit rolling plates 106 are fixedly bonded to the base plate 110. The movable unit rolling plates 204 are fixedly bonded to the movable frame 206. The fixed unit rolling plates 106 and the movable unit rolling plates 204 form the rolling surfaces of the balls 301. The movable unit 200 is displaced relative to the fixed unit 100 via the balls 301. The movable unit 200 and the fixed unit 100 are brought into contact with each other via the balls 301, and hence an external force applied to the movable unit 200 and distortion generated in the movable unit 200 are not transmitted to the fixed unit 100. That is, even when distortion is generated in the movable unit 200, distortion is not generated in the fixed unit 100. Further, even when distortion is generated due to temperature change in the members, such as the image capture device package 6', which are in contact with the movable unit 200, the generated distortion is transmitted only up to the movable frame 206. Therefore, to cope with occurrence of thermal stress due to temperature change in the image capture device package 6', it is only required to pay attention to the linear expansion coefficients of the components in a range from the image capture device package 6' to the movable frame 206. Note that since the rolling plates are additionally or separately provided, it is easy to design the surface roughness and hardness of the rolling plates in a preferable state.

By causing electric current to flow through the coils 205 in the above-mentioned magnetic circuit, the coils 205 receive the Lorentz force, whereby the movable unit 200 can be displaced. Further, the camera system controller 5 can perform feedback control using signals output from the position detection elements. The camera system controller 5 properly controls the values of signals of the position detection elements, whereby it is possible to translationally move the movable frame 206 within a plane orthogonal to the optical axis 4 and rotate the same about the optical axis. Further, it is possible to generate a rotational motion of the movable frame 206 substantially about the optical axis 4, by driving the signals of the position detection elements disposed at the mounting positions 202b and 202c in opposite phase while maintaining a signal of the position detection element disposed at the mounting position 202a to a fixed value.

The magnetic flux density in the optical axis direction is detected at each mounting position 202. The magnetic circuits formed by the upper magnets 103, the lower magnets 107, and so forth, generally have non-linear characteristics. Therefore, the magnetic flux densities detected at the mounting positions 202 do not necessarily have a fixed resolution in the whole driving range, in other words, the detection resolution varies with the position. This is because there are positions where the magnetic flux density rapidly changes and positions where the magnetic flux density moderately changes, and the amount of change of the magnetic flux density with respect to the movement amount is larger at the position where the magnetic flux density more rapidly changes, resulting in a higher detection resolution. In the magnetic circuits in the anti-vibration mechanism 114 shown in FIG. 11, a boundary position between the magnets (such as a boundary position between the upper magnet 103a and the upper magnet 103b) has the largest change in magnetic flux density and hence the highest detection resolution.

Figure 12A:
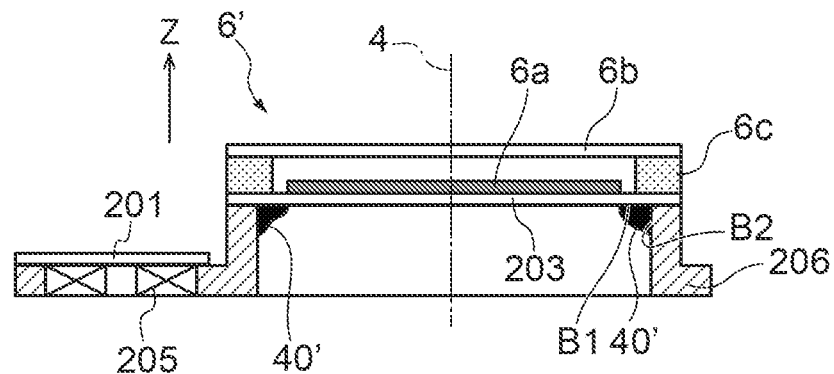
FIG. 12A is a schematic cross-sectional view showing a form of adhesion between an image capture device package and a movable frame.
Figure 12B:
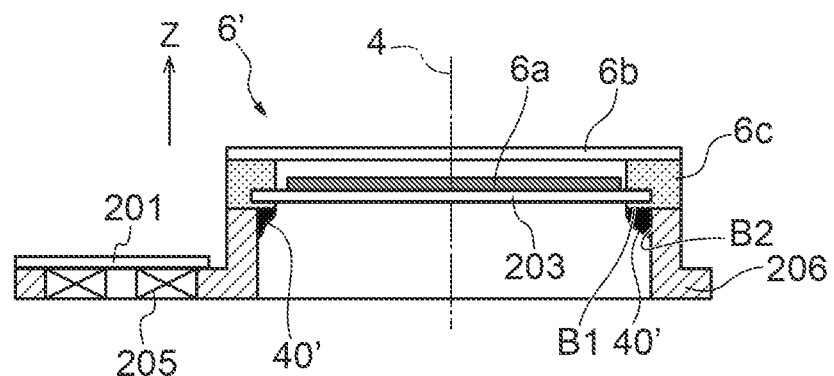
FIG. 12B is a schematic cross-sectional view showing another form of adhesion between the image capture device package and the movable frame.
Figure 12C:
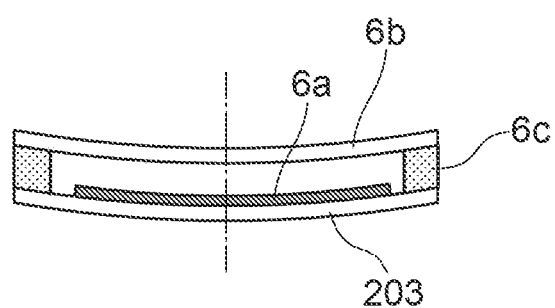
FIG. 12C is a cross-sectional view schematically showing distortion of the image capture device package.

FIGS. 12A and 12B are schematic cross-sectional views of the image capture device package 6' and the movable frame 206. The movable frame 206 is a holding member for holding the image capture device package 6'. FIG. 12A and FIG. 12B differ from each other in the form of adhesion between the movable frame 206 and the image capture device package 6'. Although the present embodiment employs the form of adhesion shown in FIG. 12A, the form of adhesion shown in FIG. 12B may be employed. FIG. 12C is a cross-sectional view schematically showing a state of distortion of the image capture device package 6', caused in a case where there are differences in linear expansion coefficient between the components within the image capture device package 6'.

As shown in FIG. 12A, the image capture device package 6' includes the image sensor 6a, a glass lid 6b, an image capture device-holding frame 6c, and the movable PCB 203. The image capture device package 6' and the movable frame 206 are fixedly bonded to each other with an adhesive 40'. Particularly, in the illustrated example in FIG. 12A, the movable PCB 203 as the component of the image capture device package 6' and the movable frame 206 are bonded to each other. In the illustrated example in FIG. 12B, the image capture device-holding frame 6c as the component of the image capture device package 6' and the movable frame 206 are bonded to each other.

In the movable unit 200, a surface bonded to the image capture device package 6' with the adhesive 40' is formed of resin. A reason for this will be described. In general, when bonding components with an adhesive, it is necessary to provide a place where the adhesive is applied (hereinafter referred to as the adhesive pool). In general, the same image capture device can be used for a lot of models, but on the other hand, the movable member 20 is designed on a model-by-model basis, and hence the adhesive pool is also designed on a model-by-model basis. For this reason, to make it possible to freely arrange the adhesive pool with a higher degree of freedom in shape, it is preferable that the bonding surface is formed by a resin.

Further, when the camera body 1 is exposed to a high-temperature or low-temperature environment, if a difference in the linear expansion coefficient is large between an outer periphery portion of the image capture device 6', as one bonding surface, and part of the movable member 200, as the other bonding surface, the image capture device 6' and the movable member 200 may warp in a direction opposite to each other. This is caused by occurrence of thermal distortion. Thus, if the image capture device 6' warps from the movable member 200, a problem is caused that the image capture device 6' tilts with respect to the optical axis 4 and hence tilts with respect to the image plane of the camera body 1001, which may cause blur in part of a photographed image. One solution for this problem is that the linear expansion coefficient of the bonding surface of the movable member 200, bonded to the image capture device 6, and the linear expansion coefficient of the bonding surface of the image capture device 6' are made closer to each other. In the present embodiment, the linear expansion coefficients of the bonding surfaces are set taking this into consideration.

First, in the illustrated example in FIG. 12A, part (surface on the − (negative) side in the z-axis direction) of the movable PCB 203 of the image capture device package 6', which is in contact with the adhesive 40', is a first adhesion interface B1. Therefore, the part forming the first adhesion interface B1 is part of the movable PCB 203. Further, part (inside surface) of the movable frame 206 of the movable unit 200, which is in contact with the adhesive 40', is a second adhesion interface B2. Therefore, the part forming the second adhesion interface B2 is part of the movable frame 206.

On the other hand, in the illustrated example in FIG. 12B, part (surface on the − (negative) side in the z-axis direction) of the image capture device-holding frame 6c of the image capture device package 6', which is in contact with the adhesive 40', is the first adhesion interface B1. Therefore, the part forming the first adhesion interface B1 is part of the image capture device-holding frame 6c which is a resin member. Further, similar to the illustrated example in FIG. 12A, part of the movable frame 206 of the movable unit 200, which is in contact with the adhesive 40', is the second adhesion interface B2. Therefore, the part forming the second adhesion interface B2 is part of the movable frame 206.

Deformation (warp) of the image capture device package 6' as a single unit, caused due to temperature change, will be described with reference to FIG. 12C. If the linear expansion coefficient is largely different between the image sensor 6a, the glass lid 6b, the image capture device-holding frame 6c, and the movable PCB 203, which are the components of the image capture device package 6', distortion is sometimes caused in the image capture device package 6' due to temperature change. For example, a warp, similar to a warp of so-called bimetal is sometimes caused.

FIG. 12C shows an example of deformation caused in a case where the linear expansion coefficient of the movable PCB 203 is larger than that of the glass lid 6b and the temperature rises. The movable PCB 203 extends more than the glass lid 6b due to increase in temperature, and hence such a warp as shown in FIG. 12C is generated. As a result, distortion is caused on the surface of the image sensor 6a, which makes it difficult to accurately adjust the focus. To suppress this phenomenon, materials whose linear expansion coefficients are close to each other are often selected for the components of the image capture device package 6'.

The image sensor 6a is made of silicon single crystal, and hence its linear expansion coefficient is small, and is approximately $2.6 \times 10^{-6}$/K at normal temperature. This value is smaller by approximately one digit, compared with metal, such as aluminum (approximately $23.1 \times 10^{-6}$/K), magnesium (approximately $24.8 \times 10^{-6}$/K), and stainless steel (SUS304: approximately $17.8 \times 10^{-6}$/K). Therefore, a circuit board material having a low linear expansion coefficient is employed for the movable PCB 203. A material having a linear expansion coefficient in a range of approximately $2 \times 10^{-6}$/K to $5 \times 10^{-6}$/K can be used for a circuit board using glass cloth having a low linear expansion coefficient. Similarly, a material having a low linear expansion coefficient is employed for the Mass lid 6b as well. For example, so-called Pyrex (registered trademark) glass having a low linear expansion coefficient of approximately $3 \times 10^{-6}$/K is employed.

A so-called low linear expansion resin for package or the like is employed for the image capture device-holding frame 6c. Examples of the material include one formed by filling epoxy with plasticizer at a high rate, and the material having a linear expansion coefficient of approximately $10 \times 10^{-6}$/K is provided. As in the above-described example, it is possible to suppress warp or the like, caused by temperature change, by using materials each having a low linear expansion coefficient, for the components forming the image capture device package 6'. This reduces the phenomenon that the image plane is bent and the focus on the whole screen cannot be adjusted.

However, if the linear expansion coefficient is largely different between the image capture device package 6' and the movable frame 206, the adhesive 40' is deformed when the temperature has change, and thermal stress is caused in the adhesive 40' and the adhesion interface. If the camera body 1001 is exposed to a condition that the temperature rapidly changes, the bonding surfaces can be peeled. Polycarbonate as resin generally used for a lot of image capture apparatuses mostly has a linear expansion coefficient of approximately $50 \times 10^{-6}$/K. Even a polycarbonate composition formed by filling glass has a linear expansion coefficient in a range of approximately $20 \times 10^{-6}$/K to $40 \times 10^{-6}$/K. As described hereinafter, resin having a linear expansion coefficient in a range of approximately $17 \times 10^{-6}$/K to $24 \times 10^{-6}$/K is employed for the movable frame 206. In general, the resin material tends to be reduced in shock resistance when the linear expansion coefficient is reduced and plasticizer is filled at a high rate. That is, if the material is selected only from the viewpoint of the linear expansion coefficient, there is a fear that a crack is caused in the movable frame 206 when the image capture apparatus is dropped.

To prevent this, in the present embodiment, the linear expansion coefficients of the components are set such that the linear expansion coefficient is gradually increased in an order from the silicon having a low linear expansion coefficient (image sensor 6a) to the movable frame 206. The order of stepwise increase in the magnitude of the linear expansion coefficient in this case is expressed by using the inequality of (image sensor 6a)<(part forming the first adhesion interface B1)<(part forming the second adhesion interface B2)<(aluminum alloy or magnesium alloy).

That is, the linear expansion coefficient of the part forming the first adhesion interface B1 (the part of the movable PCB 203 in the example in FIG. 12A and the part of the image capture device-holding frame 6c in the example in FIG. 12B) is larger than the linear expansion coefficient of the image sensor 6a. Further, the part forming the second adhesion interface B2 (part of the movable frame 206) is formed of resin. What is more, the linear expansion coefficient of the part forming the second adhesion interface B2 (part of the movable frame 206) is larger than the linear expansion coefficient of the part forming the first adhesion interface B1 (the part of the movable PCB 203 in the example in FIG. 12A and the part of the image capture device-holding frame 6c in the example in FIG. 12B). Further, the linear expansion coefficient of the part forming the second adhesion interface B2 (the part of the movable frame 206) is smaller than the linear expansion coefficient of any of the aluminum alloy and the magnesium alloy.

By arranging the components such that the linear expansion coefficient is gradually increased from the image sensor 6a to the movable frame 206 in the order expressed by the above inequality, a difference of the linear expansion coefficient between each adjacent components becomes small, compared with a case where the components are arranged in a disorderly manner. As a result, it is possible to suppress thermal stress caused due to a difference of the linear expansion coefficient between the fixed components adjacent to each other, and reduce the influence caused by temperature change without extremely narrowing the range of choices of the material. Further, since the linear expansion coefficient of the part forming the second adhesion interface B2 is smaller than the linear expansion coefficient of any of the aluminum alloy and magnesium alloy, it is possible to reduce thermal stress more than in a case where the aluminum alloy or the magnesium alloy, which is a general material of the movable frame, is used.

Examples of the resin material of the movable frame 206, satisfying the above inequality, include TORELINA A310MX04 (registered trademark), manufactured by Toray Industries, Inc. This resin contains PPS, epoxy, or nylon, as a base resin. In this resin, the linear expansion coefficient is suppressed to a range of approximately $17 \times 10^{-6}$/K to $24 \times 10^{-6}$/K by highly filling plasticizer while using PPS as the base resin. Further, this resin satisfies the requirement of the level of the shock resistance for the movable frame. Examples of this resin, which is easy to obtain good characteristics while being highly filled with plasticizer, include PPS, epoxy, or nylon. It is only required to form the movable frame 206 by using a material formed by using any of these resin materials as the base.

According to the present embodiment, the components are arranged with the adhesive 40' interposed therein such that the linear expansion coefficient is gradually increased from the image sensor 6a to the movable frame 206 in the order expressed by the above-described inequality. This makes it possible to suppress occurrence of thermal stress on the adhesion interface, caused due to temperature change, and thereby enhance the reliability of the image blur correction function.

Further, the balls 301 are sandwichingly held between the movable unit 200 and the fixed unit 100, and the fixed unit 100 holds the movable unit 200 via the balls 301 such that it is relatively displaceable. With this, even when distortion is caused in the movable unit 200 due to temperature change, the distortion is not transmitted to the fixed unit 100 and is hard to adversely affect the fixed unit 100. In this point as well, it is also possible to enhance the reliability of the image blur correction function.

Next, an eighth embodiment of the present invention will be described. In the eighth embodiment, the movable frame 206 is formed by a sheet metal member and a resin part molded integrally with the sheet metal member. The present embodiment differs from the first embodiment in the construction of the movable frame 206 and the form of adhesion between the movable frame 206 and the image capture device package 6', and is the same in the other components as the first embodiment.

Figure 13A:
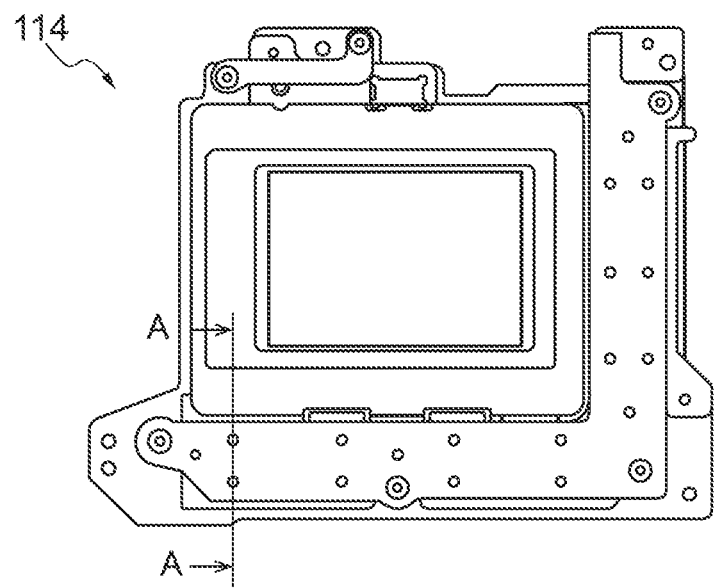
FIG. 13A is a view of the anti-vibration mechanism, as viewed from an optical axis direction.
Figure 13B:
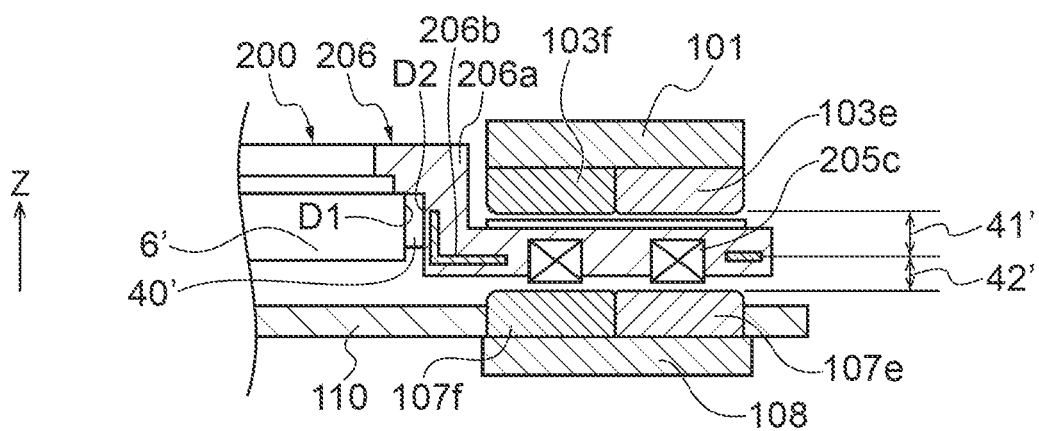
FIG. 13B is a cross-sectional view taken along A-A in FIG. 13A.

FIG. 13A is a view of the anti-vibration mechanism 114, as viewed from the optical axis direction. FIG. 13B is a cross-sectional view taken along A-A in FIG. 13A. The same component elements in FIGS. 13A and 13B as those of the first embodiment are denoted by the same reference numerals.

As shown in FIG. 13B, the movable member 206 includes a resin part 206a and a sheet metal member 206b. In the movable member 206, the resin part 206a is molded integrally with the sheet metal member 206b such that the resin part 206a covers the sheet metal member 206b. That is, the resin part 206a is formed integrally with the sheet metal member 206b by insert molding.

The balls 301 are arranged on the − (negative) side in the z-axis direction with respect to the movable unit 200. Therefore, it is preferable that the movable unit 200 is urged toward the − (negative) side in the z-axis direction. In general, in a case where two members are urged to approach each other, it is necessary to additionally provide a member for urging them. However, in the present embodiment, the urging force is obtained by making use of the magnetism of the sheet metal member 206b and the lower magnets 107.

The sheet metal member 206b is formed by a metallic material having magnetism. Part of the sheet metal member 206b is opposed to the upper magnets 103 and the lower magnets 107, and hence the sheet metal member 206b is attracted by the upper magnets 103 and the lower magnets 107 (magnetic attraction). Therefore, whether the movable unit 200 is more strongly magnetically-attracted toward the + (positive) side in the z-axis direction or the − (negative) side in the z-axis direction is determined depending on distances from the sheet metal member 206b to the upper magnets 103 and the lower magnets 107 in the z-axis direction.

Here, reference numeral 41' in FIG. 13B indicates a distance from the sheet metal member 206b to the upper magnets 103e and 103f. Reference numeral 42' indicates a distance from the sheet metal member 206b to the lower magnets 107e and 107f. Note that when comparing these distances 41' and 42', the position of the sheet metal member 206b is represented by the position of the center of the sheet metal member 206b in a direction of the thickness of the sheet metal member 206b. In the present embodiment, the distance 42' is shorter than the distance 41'. Therefore, the attraction force applied to the sheet metal member 206b is stronger on the − (negative) side in the z-axis direction than on the + (positive) side in the z-axis direction, and as a result, the movable member 200 is urged toward the base plate 110. The balls 301 are sandwichingly held by this urging force. The balls 301 are enabled to smoothly roll with less loss caused by friction.

In the present embodiment, the sheet metal member 206b of the movable frame 206 is covered with the resin part 206a. If a difference of the linear expansion coefficient between the sheet metal member 206b and the image capture device package 6' is large, it is preferable to form the resin part 206a using a resin material having a linear expansion coefficient closer to that of the image capture device package 6'. Thus, from the viewpoint of the degree of freedom in shape and the viewpoint of the physical properties of the material, it is preferable that the surface of the movable unit 200, bonded to the image capture device package 6', is formed by the resin part 206a.

For this reason, in the present embodiment, the image capture device package 6' and the resin part 206a are bonded with the adhesive 40'. Part of the image capture device package 6' (a side surface of the image capture device package 6' including at least a side surface of the image capture device-holding frame 6c), which is in contact with the adhesive 40', is a first adhesion interface D1. Therefore, the part forming the first adhesion interface D1 includes part of the image capture device-holding frame 6c. Further, part (inside surface) of the resin part 206a of the movable frame 206, which is in contact with the adhesive 40', is a second adhesion interface D2. Therefore, the part forming the second adhesion interface B2 includes part of the resin part 206a.

Here, the linear expansion coefficient of each component is considered. Stainless steel or the like is suitable for the sheet metal member 206b, and the linear expansion coefficient in this case is (SUS304: approximately $17.8 \times 10^{-6}$/K). The materials of the components of the image capture device package 6' are the same as those used in the first embodiment. As described hereinafter, resin having a linear expansion coefficient of approximately $12 \times 10^{-6}$/K is used for the movable frame 206. The linear expansion coefficient of each component is set such that the linear expansion coefficient is gradually increased in an order from the image sensor 6a to the movable frame 206. The order of increase in the magnitude of the linear expansion coefficient in this case is expressed by using the inequality of (image sensor 6a)<(part forming the first adhesion interface D1)<(part forming the second adhesion interface D2)<(sheet metal member 206b).

By arranging the components in the order expressed by the above inequality, it is possible to suppress thermal stress caused by a difference of the linear expansion coefficient between the fixed components, adjacent to each other, and reduce the influence caused by temperature change without extremely narrowing the range of choices of the material. Further, it is possible to reduce thermal stress more than in a case where the sheet metal member 206b is bonded without covering the sheet metal member 206b. Since the sheet metal member 206b is formed of metal, a range of choices of the linear expansion coefficient is narrow. However, by forming the second adhesion interface D2 using the resin part 206a of the movable frame 206, the range of choices of the material is increased.

Examples of the material of the resin part 206a, satisfying the above-mentioned condition, include TORELINA H501 (registered trademark), manufactured by Toray Industries, Inc. In this resin, the linear expansion coefficient is suppressed to approximately $12 \times 10^{-6}$/K by highly filling plasticizer while using PPS as the base resin. Further, this resin satisfies the requirement of the level of the shock resistance for the movable frame. It is only required to form the movable frame 206 by using a material formed by using this resin as the base, for the resin part 206a.

According to the present embodiment, the components are arranged with the adhesive 40' interposed therein such that the linear expansion coefficient is gradually increased from the image sensor 6a to the movable frame 206 in the order expressed by the above inequality. With this, it is possible to obtain the same advantageous effects as provided by the seventh embodiment in suppressing occurrence of thermal stress on the adhesion interface to thereby enhance the reliability of the image blur correction function. Further, it is possible to obtain the same advantageous effects as provided by the seventh embodiment in that distortion caused in the movable unit 200 is hard to be transmitted to the fixed unit 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-237496, filed Dec. 19, 2018, No. 2019-116537, filed Jun. 24, 2019, and No. 2019-116536, filed Jun. 24, 2019, which are hereby incorporated by reference herein in their entirety.

What is claimed is:

1. An image blur correction device comprising:
   a fixed member;
   a rolling member; and
   a movable member that includes a sheet metal member and a resin part molded integrally with the sheet metal member, holds an optical element, and is movable via the rolling member relative to the fixed member in a direction orthogonal to an optical axis of the optical element,
   wherein part of the movable member, where the sheet metal member is exposed from the resin part, forms a rolling surface on which the rolling member rolls, and
   wherein the sheet metal member is formed into a shape surrounding the optical element, as viewed from an optical axis direction.

2. The image blur correction device according to claim 1, further comprising an urging unit configured to urge the movable member toward the fixed member in the optical axis direction.

3. The image blur correction device according to claim 2, further comprising a magnet for driving the movable member in a direction orthogonal to the optical axis, on a side toward the fixed member across the movable member in the optical axis direction, and
   wherein the urging unit includes the magnet and a magnetic part magnetically attracted by the magnet.

4. The image blur correction device according to claim 3, further comprising another magnet for driving the movable member in a direction orthogonal to the optical axis, on a side opposite to the fixed member across the movable member in the optical axis direction, and
   wherein a distance from the magnetic part to the magnet is shorter than a distance from the magnetic part to the other magnet.

5. The image blur correction device according to claim 3, wherein the sheet metal member is formed of a magnetic material, and
   wherein the magnetic part is part of the sheet metal member.

6. The image blur correction device according to claim 3, wherein the magnetic part is formed by another member different from the sheet metal member,
   wherein the resin part is molded integrally with the other member, and
   wherein the sheet metal member is formed of a non-magnetic material.

7. The image blur correction device according to claim 2, wherein the urging unit includes a spring engaged with the fixed member and the movable member.

8. The image blur correction device according to claim 1, wherein the sheet metal member has a step, and part of the sheet metal member other than the rolling surface is made closer to the fixed member than the rolling surface in the optical axis direction, by the step.

9. The image blur correction device according to claim 1, wherein the optical element is fixed to the resin part of the movable member.

10. The image blur correction device according to claim 1, wherein the sheet metal member is electrically conductive, and
    wherein the movable member has an electrically conductive member electrically connected to the sheet metal member.

11. The image blur correction device according to claim 10, wherein the electrically conductive member is fixed to the sheet metal member by a fastening member which is electrically conductive, whereby the electrically conductive member is electrically connected to the sheet metal member.

12. The image blur correction device according to claim 10, wherein the movable member includes a cover member arranged such that the cover member covers the optical element from a side opposite to the fixed member in the optical axis direction, and
    wherein the cover member is fixed to the movable member via the electrically conductive member.

13. The image blur correction device according to claim 1, wherein the optical element is an image capture device that photoelectrically converts an optical image.

14. The image blur correction device according to claim 1, wherein the optical element is a shake correction lens.

* * * * *